(12) United States Patent
Hafenrichter et al.

(10) Patent No.: US 10,955,310 B2
(45) Date of Patent: Mar. 23, 2021

(54) VACUUM-ADHERING APPARATUS FOR AUTOMATED INSPECTION OF AIRFOIL-SHAPED BODIES WITH IMPROVED SURFACE MOUNTING

(71) Applicant: The Boeing Company, Chicago, IL (US)

(72) Inventors: Joseph L. Hafenrichter, Auburn, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 16/128,687

(22) Filed: Sep. 12, 2018

(65) Prior Publication Data

US 2020/0080911 A1  Mar. 12, 2020

(51) Int. Cl.
*G01M 5/00* (2006.01)
*B60B 19/00* (2006.01)

(52) U.S. Cl.
CPC ......... *G01M 5/0075* (2013.01); *B60B 19/003* (2013.01); *G01M 5/0016* (2013.01)

(58) Field of Classification Search
None
See application file for complete search history.

(56) References Cited

U.S. PATENT DOCUMENTS

| | | |
|---|---|---|
| 3,789,947 A | 2/1974 | Blumrich |
| 4,146,967 A | 4/1979 | Rohner et al. |
| 5,031,458 A | 7/1991 | Young et al. |
| 5,623,107 A | 4/1997 | Patterson, Sr. et al. |
| 5,698,787 A | 12/1997 | Parzuchowski et al. |
| 6,167,760 B1 | 1/2001 | Brunty et al. |
| 6,220,099 B1 | 4/2001 | Marti et al. |
| 6,378,387 B1 | 4/2002 | Froom |
| 6,829,959 B2 | 12/2004 | Gifford et al. |

(Continued)

FOREIGN PATENT DOCUMENTS

WO   2011107087 A2   9/2011

*Primary Examiner* — Brandi N Hopkins
*Assistant Examiner* — Nigel H Plumb
(74) *Attorney, Agent, or Firm* — Ostrager Chong Flaherty & Broitman P.C.

(57) ABSTRACT

A vacuum-adhering apparatus for automated non-destructive inspection (NDI) of airfoil-shaped bodies with improved surface mounting. The apparatus may be used to inspect the leading edge surface and other surfaces of a wind turbine blade, a helicopter rotor blade, or an aircraft wing. The apparatus includes a multiplicity of wheels and a multiplicity of omnidirectional rolling elements rotatably coupled to a flexible substrate made of semi-rigid material. The wheels are configured to enable omnidirectional motion of the flexible substrate. The apparatus further includes flexible vacuum seals supported by the flexible substrate and vacuum adherence devices that keep the wheels frictionally engaged on the surface of the airfoil-shaped body regardless of surface contour. The apparatus also includes a flexible sensor array attached to or integrally formed with the flexible substrate. The crawler vehicle is capable of adhering to and moving over a non-level surface while enabling the sensor array to acquire NDI scan data from the surface under inspection.

24 Claims, 13 Drawing Sheets

(56) References Cited

U.S. PATENT DOCUMENTS

| | | |
|---|---|---|
| 6,945,111 B2 | 9/2005 | Georgeson |
| 7,083,383 B2 | 8/2006 | Loftus et al. |
| 7,231,826 B2 | 6/2007 | Bossi et al. |
| 7,240,556 B2 | 7/2007 | Georgeson et al. |
| 7,315,609 B2 | 1/2008 | Safai et al. |
| 7,337,673 B2 | 3/2008 | Kennedy et al. |
| 7,562,593 B2 | 7/2009 | Engelbart et al. |
| 7,626,383 B1 | 12/2009 | Sun et al. |
| 7,640,811 B2 | 1/2010 | Kennedy et al. |
| 7,643,893 B2 | 1/2010 | Troy et al. |
| 7,716,989 B2 | 5/2010 | Kollgaard |
| 8,060,270 B2 | 11/2011 | Vian et al. |
| 8,199,194 B2 | 6/2012 | Troy et al. |
| 8,347,746 B2 | 1/2013 | Hafenrichter et al. |
| 8,483,356 B2 | 7/2013 | Bendahan |
| 8,738,226 B2 | 5/2014 | Troy et al. |
| 8,743,196 B2 | 6/2014 | Fritz et al. |
| 8,807,257 B1 | 8/2014 | Hansen et al. |
| 8,874,371 B2 | 10/2014 | Troy et al. |
| 8,892,252 B1 | 11/2014 | Troy et al. |
| 9,156,321 B2 | 10/2015 | Troy et al. |
| 9,302,787 B2 | 4/2016 | Hafenrichter et al. |
| 9,481,082 B1 | 11/2016 | Hafenrichter et al. |
| 9,574,549 B2 * | 2/2017 | Lee .................. B08B 7/04 |
| 9,643,313 B2 | 5/2017 | Hafenrichter et al. |
| 9,791,420 B2 | 10/2017 | Holmes et al. |
| 2002/0036108 A1 | 3/2002 | Jeswine et al. |
| 2003/0147493 A1 | 8/2003 | Bueno et al. |
| 2006/0043303 A1 | 3/2006 | Safai et al. |
| 2006/0055396 A1 | 3/2006 | Georgeson et al. |
| 2007/0096727 A1 | 5/2007 | Rempt et al. |
| 2009/0038398 A1 | 2/2009 | Lavoie et al. |
| 2010/0011864 A1 | 1/2010 | Hanan et al. |
| 2010/0132137 A1 | 6/2010 | Eggleston et al. |
| 2011/0178727 A1 | 7/2011 | Hafenrichter et al. |
| 2012/0060611 A1 | 3/2012 | Thommen-Stamenkov et al. |
| 2012/0153032 A1 | 6/2012 | Svanebjerg et al. |
| 2013/0261876 A1 | 10/2013 | Froom et al. |
| 2013/0289766 A1 * | 10/2013 | Hafenrichter .......... B25J 5/00 700/245 |
| 2013/0298682 A1 | 11/2013 | Motzer et al. |
| 2013/0304251 A1 | 11/2013 | Garvey et al. |
| 2014/0182479 A1 * | 7/2014 | Hafenrichter .......... B64F 5/60 105/30 |

* cited by examiner

VACUUM-ADHERING APPARATUS FOR AUTOMATED INSPECTION OF AIRFOIL-SHAPED BODIES WITH IMPROVED SURFACE MOUNTING

BACKGROUND

The present disclosure relates generally to the field of non-destructive inspection of airfoil-shaped bodies, and more particularly to a non-destructive inspection apparatus capable of scanning a surface of an airfoil-shaped body, such as a rotorcraft blade, an aircraft propeller, winglets, a projectile fin, an aircraft tail section, a wind turbine blade, for the purpose of detecting structural anomalies.

Non-destructive testing of structures involves thoroughly examining a structure without harming the structure or requiring significant disassembly of the structure. Non-destructive testing is advantageous for many applications in which a thorough inspection of the exterior and/or interior of a structure is required. Various types of sensors may be utilized to perform non-destructive testing. One or more sensors may move over the portion of the structure to be examined, and acquire data regarding the structure. For example, a pulse-echo, thru-transmission, or shear wave sensor may be utilized to obtain ultrasonic data, such as thickness gauging, detection of laminar defects and porosity, and/or crack detection in the structure. Resonance, pitch/catch or mechanical impedance sensors may be utilized to provide indications of voids or porosity, such as in adhesive bondlines of the structure. In addition, single and dual eddy current sensors impart and detect eddy currents within a structure so as to identify cracks and/or corrosion, particularly in metallic and other conductive structures. The data acquired by the sensors is typically processed by a processing element, and the processed data may be presented to a user via a display.

Non-destructive testing is commonly utilized in the aircraft industry to inspect aircraft structures (such as airfoil-shaped bodies) for any type of internal or external anomaly in the structure. As used herein, the term "airfoil-shaped body" means an elongated body having two surfaces connecting a leading edge having a curved (e.g., rounded) profile (hereinafter "curved leading edge") to a sharp (e.g., angled) trailing edge (hereinafter "angled trailing edge"). Examples of structures which meet the foregoing definition include, but are not limited to wind turbine blades, helicopter rotor blades, and aircraft wings.

One technique for assessing the structural condition of airfoil-shaped bodies such as rotor blades and wind turbine blade is automated scanning. Various solutions involving apparatus configured to travel along a non-level surface of an airfoil-shaped body have been proposed. For example, solutions have been proposed in which a crawling robot (hereinafter "crawler vehicle"), carrying a non-destructive inspection (NDI) sensor unit, is adhered to and scanned over the surfaces (including non-level surfaces) of an airfoil-shaped body.

Leading edges of airfoil-shaped bodies are a challenge to inspect using crawler vehicles because of their contoured geometry. Leading edges are contoured strongly in one direction but relatively linear in the spanwise direction. Existing solutions use individual crawler vehicles that carry one or more NDI sensor units that must be mechanically pushed over the leading edge surface. Due to geometry challenges, these solutions can require complex mechanical or even manual positioning of an array or sensor. Crawler vehicles can have difficulty following tighter contours without getting stuck. Large-area inspection coverage of the leading edge can take a long time.

An apparatus for non-destructive inspection that can fully cover the leading edge and side surfaces of an airfoil-shaped body without changing equipment would reduce costs and speed up inspections. Thus it would be advantageous to provide an apparatus capable of adhering to and scanning the surface areas of an airfoil-shaped body, including the curved surface area along the leading edge.

SUMMARY

The subject matter disclosed herein is directed to an apparatus for automated non-destructive inspection (NDI) of the leading edge surface and other surfaces of an airfoil-shaped body, such as a wind turbine blade, a helicopter rotor blade and an aircraft wing. The apparatus takes the form of a crawler vehicle having a multiplicity of omnidirectional wheels rotatably coupled to a flexible base that includes a flexible substrate made of semi-rigid material. The flexible base incorporates (or has attached thereto) vacuum adherence devices that keep the wheels frictionally engaged on the surface regardless of surface contour. Thus the crawler vehicle is capable of adhering to and moving over a non-level surface while enabling an NDI sensor unit (one sensor or an array of sensors) mounted thereon to acquire NDI scan data from the surface under inspection.

In accordance with some embodiments disclosed in some detail hereinafter, the crawler vehicle is equipped with a multiplicity of wheels (e.g., four or more) which are configured to enable omnidirectional motion of the crawler vehicle. In accordance with some embodiments, the flexible base of the crawler vehicle is equipped with two or more vacuum adherence devices which form respective suction zones. In some configurations, a pair of omnidirectional wheels (e.g., omni wheels or Mecanum wheels) are flanked by a pair of vacuum adherence devices in the form of flexible skirts that bound suction zones in fluid communication with respective vacuum ports. In accordance with other embodiments, the omnidirectional wheels are flanked by respective multiplicities of vacuum adherence devices in the form of pivotable seal assemblies.

This disclosure uses the term "adherence" in a sense that may be deemed not an "ordinary" meaning to be found in a non-technical dictionary. Some vacuum-adhering surface crawling vehicles (hereinafter "crawler vehicle") are capable of performing maintenance functions while traveling along an airfoil-shaped body. The vacuum adherence functionality is provided by one or more vacuum adherence devices that produce suction forces that may hold the crawler vehicle on a non-level surface. Omnidirectional rolling elements are provided to assist in aligning the crawler vehicle with the airfoil-shaped body, which omnidirectional rolling elements are preferably capable of omnidirectional movement. The omnidirectional rolling elements (e.g., ball rollers) work in conjunction with the vacuum adherence devices (e.g., one or more floating flexible vacuum plates and/or one or more floating suction cups) to enable the crawler vehicle to adhere to but still move laterally over the surface of the airfoil-shaped body. Thus, the term "adherence" as used herein means a type of adherence that allows the crawler vehicle to move laterally over a surface of an airfoil-shaped body, not a type of adherence wherein the crawler vehicle is not movable laterally.

In accordance with one proposed implementation of the omnidirectionally movable apparatus described above, each vacuum adherence device is a skirt made of flexible material (hereinafter "flexible skirt") that bounds a suction zone (e.g., a volume of space) and acts as a seal to help maintain a state of low pressure (e.g., vacuum pressure) in the suction zone. Omnidirectional rolling elements (e.g., ball rollers) positioned within each suction zone keep the associated flexible skirt optimally offset from a surface of changing contour, so the crawler vehicle easily glides over even tight leading edge contours, while still adhering to the surface of the airfoil. A wheel suspension is designed to maintain a consistent normal contact force (being exerted by the suspended wheel) regardless of surface contour. Optionally, the flexible base includes a flexible substrate made of elastomeric material configured to also help provide a consistent normal contact force. Independently driven wheels provide the capability of complete travel in all directions (hereinafter "omnidirectional motion"), for full leading edge inspection, without the need to turn around. In accordance with one proposed implementation, sensor arrays on two opposite edges of the flexible base allow the apparatus to inspect up to an edge of the airfoil-shaped body without turning around.

Although various embodiments of an apparatus for automated non-destructive inspection of the leading edge surface and other surfaces of an airfoil-shaped body are described in some detail later herein, one or more of those embodiments may be characterized by one or more of the following aspects.

One aspect of the subject matter disclosed in detail below is an apparatus comprising: a flexible substrate which is conformable to a curved surface on a leading edge of an airfoil-shaped body; a multiplicity of wheels rotatably coupled to the flexible substrate and configured to enable omnidirectional motion of the flexible substrate; a multiplicity of omnidirectional rolling elements rotatably coupled to the flexible substrate; a flexible sensor array attached to or integrally formed with the flexible substrate; a multiplicity of motors fixedly coupled to the flexible substrate and operatively coupled to drive rotation of the multiplicity of wheels; and a multiplicity of flexible vacuum seals supported by the flexible substrate.

In accordance with some embodiments of the apparatus described in the immediately preceding paragraph, the multiplicity of flexible vacuum seals comprise first and second flexible skirts that bound first and second suction zones respectively, the apparatus further comprising first and second vacuum ports in fluid communication with the first and second suction zones respectively. The first suction zone is partly occupied by a first plurality of omnidirectional rolling elements, while the second suction zone is partly occupied by a second plurality of omnidirectional rolling elements. In accordance with various embodiments, some or all of the multiplicity of wheels are positioned between the first and second suction zones. In accordance with other embodiments of the apparatus, the multiplicity of flexible vacuum seals comprise pivotable seal assemblies.

Another aspect of the subject matter disclosed in detail below is an apparatus comprising: a flexible substrate having a multiplicity of openings; a multiplicity of wheel suspension assemblies attached to the flexible substrate, each wheel suspension assembly overlying a respective opening in the flexible substrate; a multiplicity of wheels rotatably coupled to the multiplicity of wheel suspension assemblies, positioned in the multiplicity of openings, and configured for omnidirectional motion; a multiplicity of motors attached to and supported by the multiplicity of wheel suspension assemblies and operatively coupled to drive rotation of the multiplicity of wheels; a flexible sensor array attached to or integrally formed with the flexible substrate; a first multiplicity of omnidirectional rolling elements which are rotatable relative to the flexible substrate; a first flexible skirt projecting from the flexible substrate and bounding a first suction zone that is partly occupied by respective portions of the first multiplicity of omnidirectional rolling elements; a second multiplicity of omnidirectional rolling elements which are rotatable relative to the flexible substrate; and a second flexible skirt projecting from the flexible substrate and bounding a second suction zone that is partly occupied by respective portions of the second multiplicity of omnidirectional rolling elements. The multiplicity of wheels are disposed the first and second suction zones. In accordance with one embodiment, the wheels are omni wheels. In accordance with another embodiment, the wheels are Mecanum wheels. In accordance with a further embodiment, the wheels are steerable and made of an elastomeric solid material. The sensors are non-destructive inspection sensors, such as ultrasonic transducers or eddy current sensors. More specifically, each sensor array may consist of a multiplicity of ultrasonic transducers or a multiplicity of eddy current sensors.

In accordance with one proposed implementation, each wheel suspension assembly of the multiplicity of wheel suspension assemblies comprises: a slider post fixedly coupled to the flexible substrate; a slider bushing that is slidably coupled to and not rotatable relative to the slider post, the wheel being rotatable relative to but not translatable relative to the slider bushing; and a spring that urges the slider bushing to slide along the slider post.

In accordance with another proposed implementation, each wheel suspension assembly of the multiplicity of wheel suspension assemblies comprises: a slider post fixedly coupled to the flexible substrate; a slider bushing that is slidably coupled to and not rotatable relative to the slider post; a spring that urges the slider bushing to slide along the slider post; a turret head which is rotatably coupled to the slider bushing and through which the slider post passes; and a suspension arm fixedly coupled to the turret head, the wheel being rotatable relative to but not translatable relative to the suspension arm.

A further aspect of the subject matter disclosed in detail below is an apparatus comprising: a flexible substrate which is conformable to a curved surface; a multiplicity of wheels rotatably coupled to the flexible substrate and configured for omnidirectional motion; a multiplicity of omnidirectional rolling elements rotatably coupled to the flexible substrate; a flexible sensor array attached to or integrally formed with the flexible substrate; a multiplicity of motors fixedly coupled to the flexible substrate and operatively coupled to drive rotation of the multiplicity of wheels; and a flexible skirt projecting from the flexible substrate and bounding a suction zone that is partly occupied by respective portions of the multiplicity of omnidirectional rolling elements. The flexible substrate is conformable to a curved surface of an airfoil-shaped body intersected by a leading edge. In accordance with some embodiments, the omnidirectional rolling elements are ball rollers.

Other aspects of an apparatus for non-destructive inspection of the leading edge surface and other surfaces of an airfoil-shaped body are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, an apparatus for automated non-destructive inspection of the leading edge surface and other surfaces of an airfoil-shaped body will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
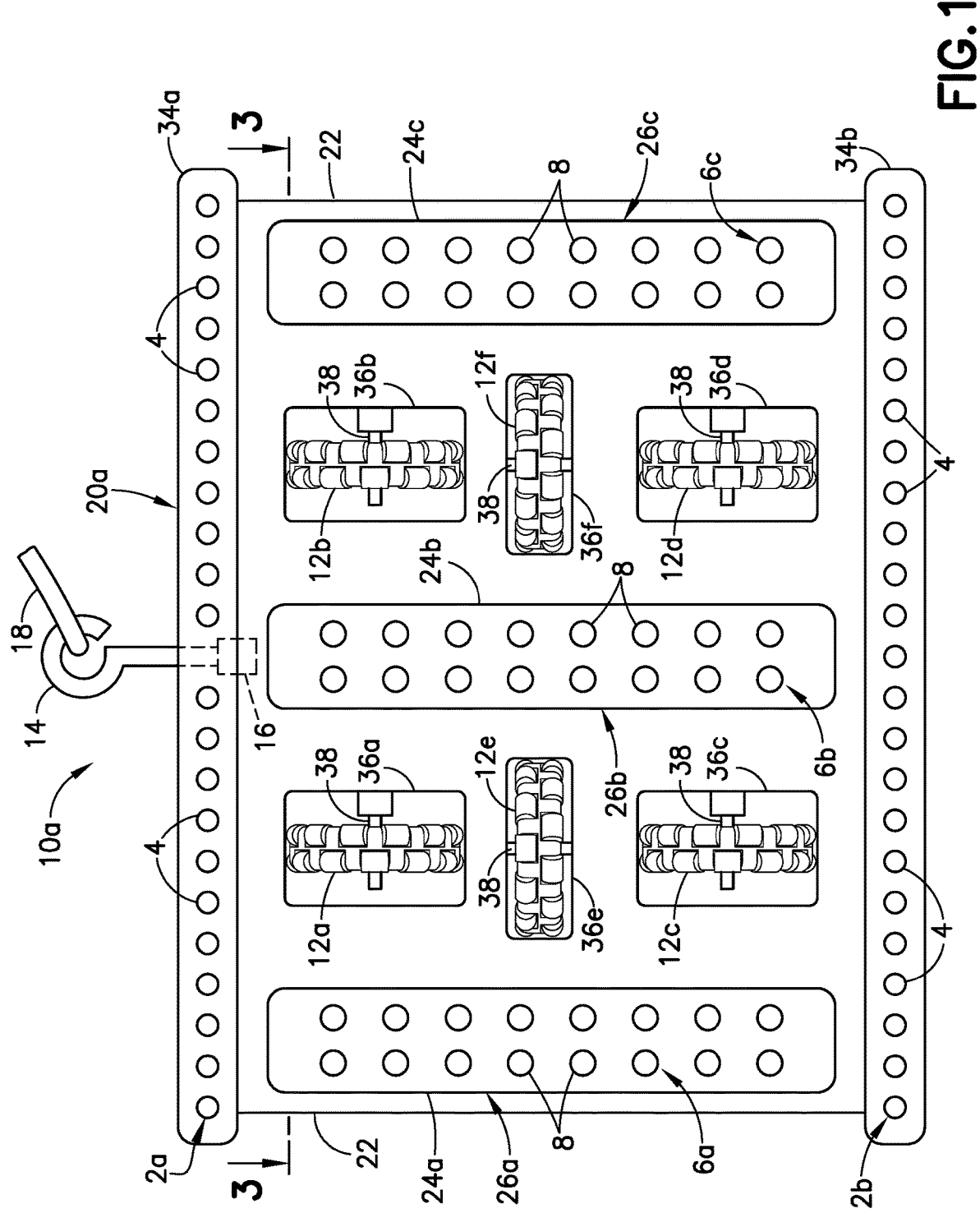
FIG. 1 is a diagram representing a bottom view of a conformable omni-wheeled crawler vehicle having a flexible base in accordance with a first embodiment. The crawler vehicle is shown with the flexible base in an unflexed (e.g., planar) state.

FIG. 1 is a diagram representing a bottom view of a conformable omni-wheeled crawler vehicle 10a having a flexible base 20a in accordance with a first embodiment. The crawler vehicle 10a is shown with the flexible base 20a in an unflexed (e.g., planar) state. The flexible base 20a includes a flexible substrate 22 having a multiplicity of openings 36a-36f and a pair of flexible sensor array supports 34a and 34b attached to or integrally formed with opposite sides of the flexible substrate 22. In other words, the flexible substrate 22 and flexible sensor array supports 34a and 34b may be made of the same material.

Figure 2:
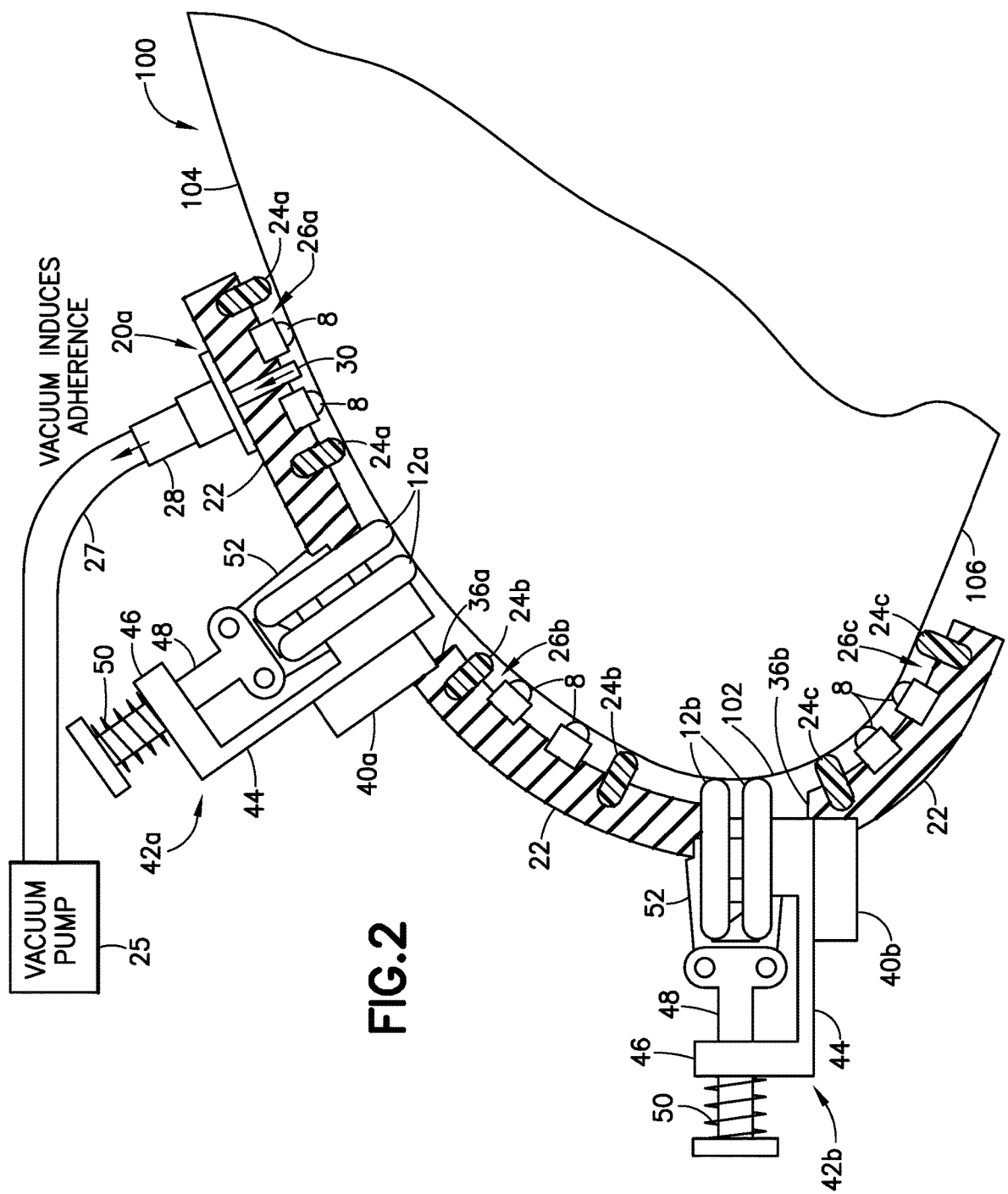
FIG. 2 is a diagram representing a partial sectional view of the conformable omni-wheeled crawler vehicle depicted in FIG. 1, but in a state wherein the flexible base is flexed to conform to a curved leading edge of an airfoil-shaped body.

FIG. 2 is a diagram representing a partial sectional view of the conformable omni-wheeled crawler vehicle 10a depicted in FIG. 1, but in a state wherein the flexible base 20a is flexed to conform to a curved leading edge 102 of an airfoil-shaped body 100 having a first side surface 104 and a second side surface 106. In accordance with various proposed implementations, the flexible substrate 22 is made of silicone rubber or other elastomeric material, a viscoelastomeric material, or some other suitable flexible material.

Referring again to FIG. 1, the crawler vehicle 10a includes a multiplicity of omni wheels 12a-12f which are rotatably coupled to the flexible base 20a and configured to enable omnidirectional motion of the flexible base 20a. The flexible base 20a has six openings 36a-36f which enable the omni wheels 12a-12f to respectively contact any surface on which the crawler vehicle 10a is placed. Each of the multiplicity of omni wheels 12a-12f has a respective shaft 38 which is operatively coupled to a respective drive motor (not visible in FIG. 1, but see drive motors 40a-42f in FIG. 4). In the proposed implementation depicted in FIG. 1, the shafts 38 of the omni wheels 12a-12d are parallel to each other, while the shafts 38 of the omni wheels 12e and 12f are parallel to each other and perpendicular to the shafts of the omni wheels 12a-12d.

The multiplicity of drive motors 40a-40f are fixedly coupled to the flexible base 20a and operatively coupled to drive rotation of the multiplicity of omni wheels 12a-12f.

Although the drive motors 40a-42f are independently operable by means of respective motor controllers (not shown in FIG. 1, but see motor controllers 32 in FIG. 9), the operation of the drive motors 40a-42f may be coordinated by a master controller or control computer to produce omnidirectional movement of the crawler vehicle 10a while the crawler vehicle 10a is vacuum adhered to a surface of the airfoil-shaped body 100.

As best seen in FIG. 1, the flexible base 20a of crawler vehicle 10a is further configured to incorporate respective vacuum adherence devices that form respective suction zones 26a-26c underneath the flexible base 20a. The vacuum adherence devices keep the wheels frictionally engaged on the surface regardless of surface contour. The structure of the flexible base 20a in accordance with the embodiment depicted in FIGS. 1 and 2 includes a flexible substrate 22 (made, e.g., of semi-rigid rubber optionally reinforced with carbon or nylon rods) that may be vacuum adhered to a surface by means of three low-surface-friction flexible skirts 24a-24c (each made, e.g., of rubber) attached to the flexible substrate 22 to form respective perimeters of respective suction zones 26a-26c. Three pluralities 6a-6c of omnidirectional rolling elements 8 (e.g., ball rollers rotatable within respective sockets) are rollably coupled to the flexible substrate 22. When in a flattened state, the shape of the flexible substrate 22 is rectangular, in which state each of the pluralities 6a-6c of omnidirectional rolling elements 8 is arranged in two rows, as seen in FIG. 1. The omnidirectional rolling elements 8 keep the associated flexible skirt optimally offset from a surface of changing contour, so the crawler vehicle 10a is able to glide easily over even tight leading edge contours, while still adhering to the surface of the airfoil.

The portions of the flexible substrate 22 which are bounded by the flexible skirts 24a-24c and the opposing surfaces of the airfoil-shaped body 100 form respective suction zones 26a-26c which may be substantially sealed along each perimeter by the flexible skirts 24a-24c during crawler vehicle movement. The flexible skirts 24a-24c are designed so that when the omnidirectional rolling elements 8 are in contact with a surface of the airfoil-shaped body 100, the low-surface-friction edges of the flexible skirts 24a-24c will also contact the surface, effectively maintaining vacuum pressure within each of the partially evacuated suction zones 26a-26c, which in turn maintains vacuum adherence of the crawler vehicle 10a to the airfoil-shaped body 100.

More specifically, the flexible base 20a depicted in FIGS. 1 and 2 includes: a first flexible skirt 24a that bounds a first suction zone 26a; a first plurality 6a of omnidirectional rolling elements 8 rotatably coupled to the flexible base 20a inside the first suction zone 26a; a second flexible skirt 24b that bounds a second suction zone 26b; a second plurality 6b of omnidirectional rolling elements 8 rotatably coupled to the flexible base 20a inside the second suction zone 26b; a third flexible skirt 24c that bounds a third suction zone 26c; and a third plurality 6c of omnidirectional rolling elements 8 rotatably coupled to the flexible base 20a inside the third suction zone 26c. As partly shown in FIG. 2, in addition to a flexible skirt, each vacuum adherence device further includes a respective channel 30 and a respective vacuum port 28 (only one of which is depicted in FIG. 2) which is in fluid communication with a respective suction zone via the respective channel 30.

The flexible substrate 22 can be formed by molding. The flexible substrate 22 includes respective openings that have the respective channels 30 (only one of which is visible in FIG. 2) embedded therein. Each vacuum port 28 is in fluid communication with a vacuum pump 25 via a hose 27. When the vacuum pump 25 is activated, the suction zones 26a-26c will be partially evacuated to create suction forces that hold the crawler vehicle 10a on the surface of the airfoil-shaped body 100, but still allow the crawler vehicle 10a to move laterally, e.g., during a sensor scanning operation. The flow of air through channel 30 and out vacuum port 28 during evacuation is indicated by arrows in FIG. 2.

To protect against the crawler vehicle 10a falling to the ground during an inspection procedure, the crawler vehicle 10a seen in FIG. 1 has a hook 14 to which one end of a cable 18 is fastened. The hook 14 may be fixedly attached to the flexible base 20a by embedding a hook anchor 16 in the elastomeric or other material of the flexible base 20a. To provide fall protection, the other end of the cable may be attached to a boom arm or to some structure supporting the airfoil-shaped body 100 to be inspected or to a carriage that travels along a track which has been attached to the airfoil-shaped body 100. During a scanning operation, a portion of the cable 18 may be wound or unwound as needed to enable the vacuum-adhered crawler vehicle 10a to move around while maintaining cable slack within an acceptable range that does not interfere with or constrain crawler vehicle movement.

The crawler vehicle 10a depicted in FIGS. 1 and 2 further includes a pair of sensor arrays 2a and 2b disposed on opposites sides of the flexible base 20a. Each of the sensor arrays 2a and 2b includes a respective multiplicity of sensors 4 which may be arranged in spaced relationship along a line as seen in FIG. 1 or in accordance with alternative arrangement such as staggered rows and so forth. The sensors 4 may be any one of a number of types of non-destructive inspection sensors, such as ultrasonic transducers or eddy current sensors. The sensor arrays 2a and 2b are respectively attached to and supported by respective flexible sensor array supports 34a and 34b, which may be either connected to or integrally formed with the flexible substrate 22. In either case, the flexible sensor array supports 34a and 34b and the flexible substrate 22 may be made of the same materials, e.g., an elastomeric or viscoelastic material.

The apparatuses disclosed herein (including the crawler vehicle 10a depicted in FIGS. 1 and 2) are configured to enable NDI coverage of the surface area intersected by the leading edge 102 of the airfoil-shaped body 100. For example, first the airfoil-shaped body 100 may be rotated to an angular position whereat the leading edge 102 is disposed generally horizontally. Then the flexible base 20a is placed on a surface intersected by the leading edge 102 of the airfoil-shaped body 100 with the sensor arrays 2a and 2b being disposed in respective planes that are generally perpendicular to the leading edge 102. Such positioning of the crawler vehicle 10a is partly depicted in FIG. 2. Then the omni wheels 12a-12d may be rotated in unison to cause the crawler vehicle 10a to move in a spanwise direction and following the trailing edge 102. During this movement, the sensors 4 of one or both of the sensor arrays 2a and 2b may be activated to acquire NDI sensor data containing information regarding the structural health of the leading edge area of the airfoil-shaped body 100.

In accordance with one possible scanning procedure, first the crawler vehicle 10a is moved along a generally horizontal leading edge 102 toward the root of an airfoil-shaped body 100. During movement toward the root, one sensor array 2a may be used to inspect the leading edge area up to the root of the airfoil-shaped body 100, while the other sensor array 2b is inactive. Then the crawler vehicle 10a is moved along the generally horizontal leading edge 102 toward the tip of the airfoil-shaped body 100. During movement toward the tip, the other sensor array 2b may be used to inspect the leading edge area up to the trailing edge 108 of the airfoil-shaped body 100, while the sensor array 2a is inactive. In accordance with alternative scanning schemes, both sensor arrays 2a and 2b may be active concurrently.

Figure 10:
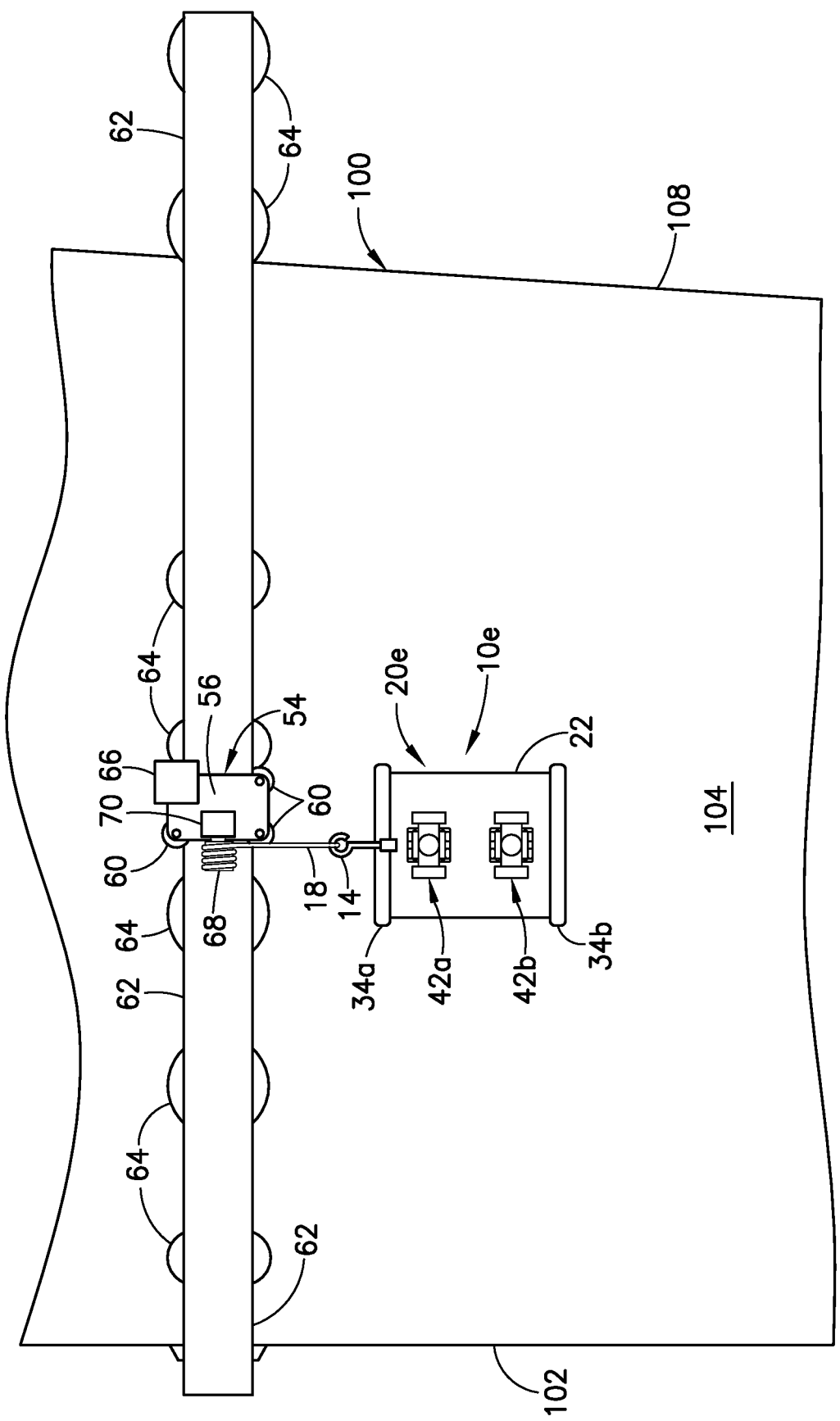
FIG. 10 is a diagram representing a front view of a portion of a generally vertically oriented airfoil-shaped body having a carriage movably mounted on a generally horizontal flexible track attached to the airfoil-shaped body and having a conformable crawler vehicle connected to the carriage by means of a tether cable in accordance with an alternative embodiment.
Figure 11:
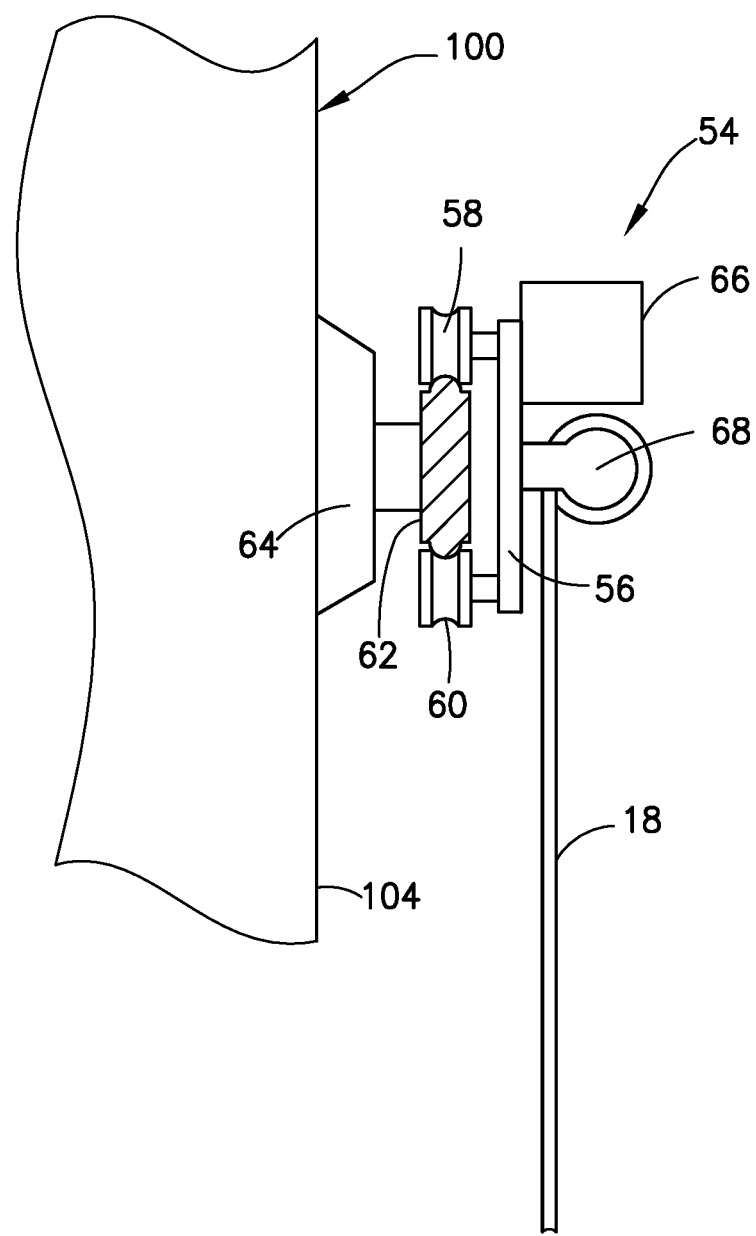
FIG. 11 is a diagram representing a sectional view of the track on which the carriage depicted in FIG. 10 is mounted.

In accordance with another scanning scenario, the crawler vehicles disclosed herein may be used to scan not only the leading edge areas, but also the side surfaces 104 and 106 (see FIG. 2) up to the trailing edge 108 while the airfoil-shaped body 100 is in a generally vertical position (see, e.g., FIGS. 10 and 11). More specifically, the flexible base 20a depicted in FIGS. 1 and 2 is configured to enable the crawler vehicle 10a to circumnavigate the profile of the airfoil-shaped body 100 starting from a position adjacent to the trailing edge 108 on the side surface 104 and ending at a position adjacent to the trailing edge 108 on the side surface 106, including smoothly crossing over the leading edge 102 during the transition from one side surface to the other. During transit of the vacuum-adhered crawler vehicle 10a across side surface 104, over leading edge 102, and across side surface 106, the sensors 4 may be repeatedly activated to acquire NDI sensor data, including from the surface area intersected by the leading edge 102.

The embodiment depicted in FIG. 1 has three suction zones 26a-26c which are spaced apart from each other along the length of the flexible base 20a and generally parallel to each other. The omni wheels 12a, 12c and 12e are disposed between the suction zones 26a and 26b, while the omni wheels 12b, 12d and 12f are disposed between the suction zones 26b and 26c. The suctions forces produced in the suction zones 26a-26c cause the flexible base 20a to flex, which flexure enables the flexible base 20a to conform to the shape of a confronting curved surface. In turn, the reaction forces produced when the elastomeric material of the flexible substrate 22 is flexed urge the omni wheels 12a-12f into contact with the confronting surface. Moreover, as the flexible substrate 22 bends to conform to a confronting surface, the sensor array supports 34a and 34b also bend to conform to the surface. This brings all of the sensors 4 of sensor arrays 2a and 2b into proximity with or in contact with the surface to be interrogated.

Since the omni wheels 12a-12f are configured to enable the crawler vehicle 10a to move in any direction, many different scanning paths are possible. For example, the control computer may be configured to cause the crawler vehicle 10a to scan the side surfaces 104 and 106 using serpentine scan paths and then scan the leading edge area using a linear scan path that follows the leading edge 102.

Figure 3:
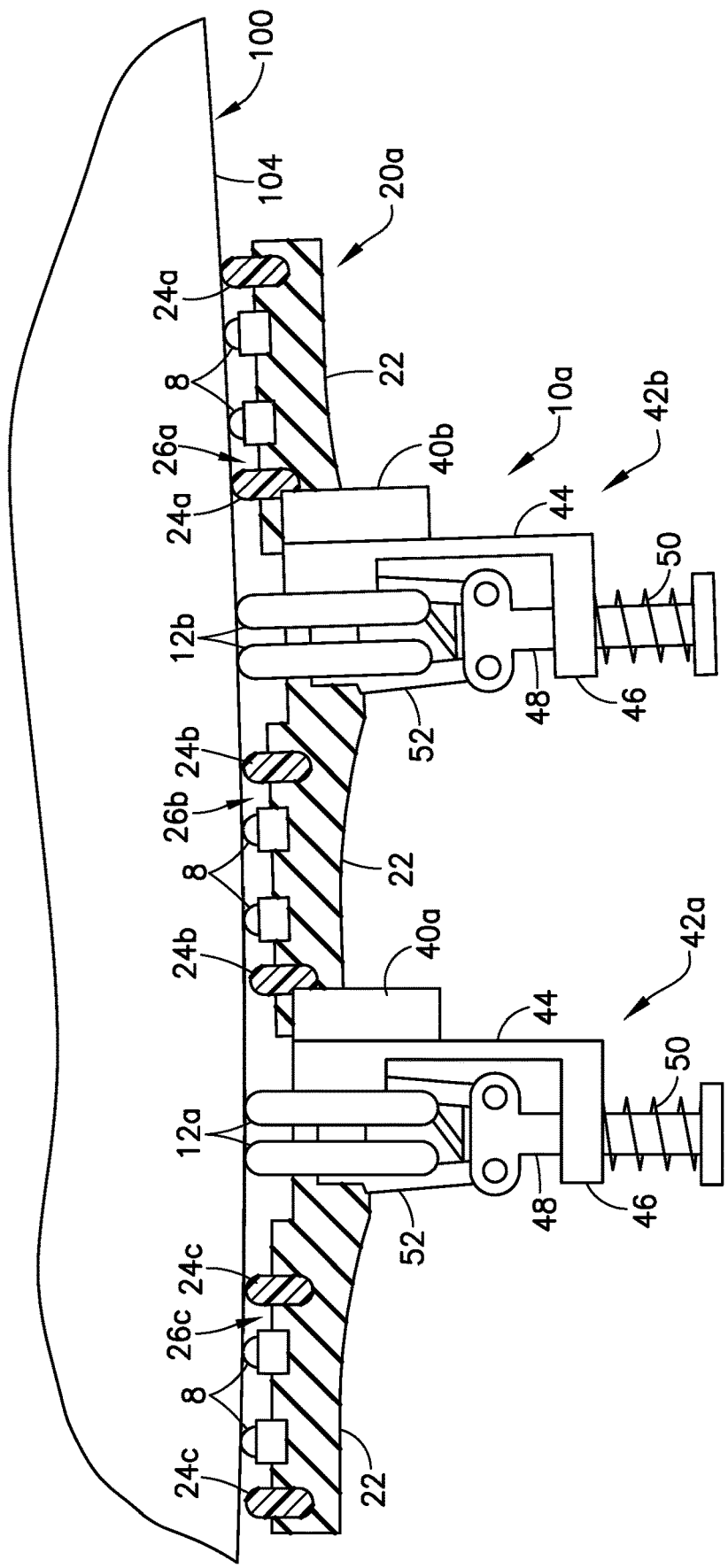
FIG. 3 is a diagram representing a partial sectional view of the conformable omni-wheeled crawler vehicle depicted in FIG. 1. The cross section is taken in a plane indicated by section line 3-3 in FIG. 1.

In addition, the crawler vehicle 10a may be designed to be capable of vacuum adhering to a downward-facing surface while in an upside-down position. FIG. 3 is a diagram representing a partial sectional view of the crawler vehicle 10a vacuum-adhered to a side surface 104 of a horizontally disposed airfoil-shaped body 100.

Figure 4:
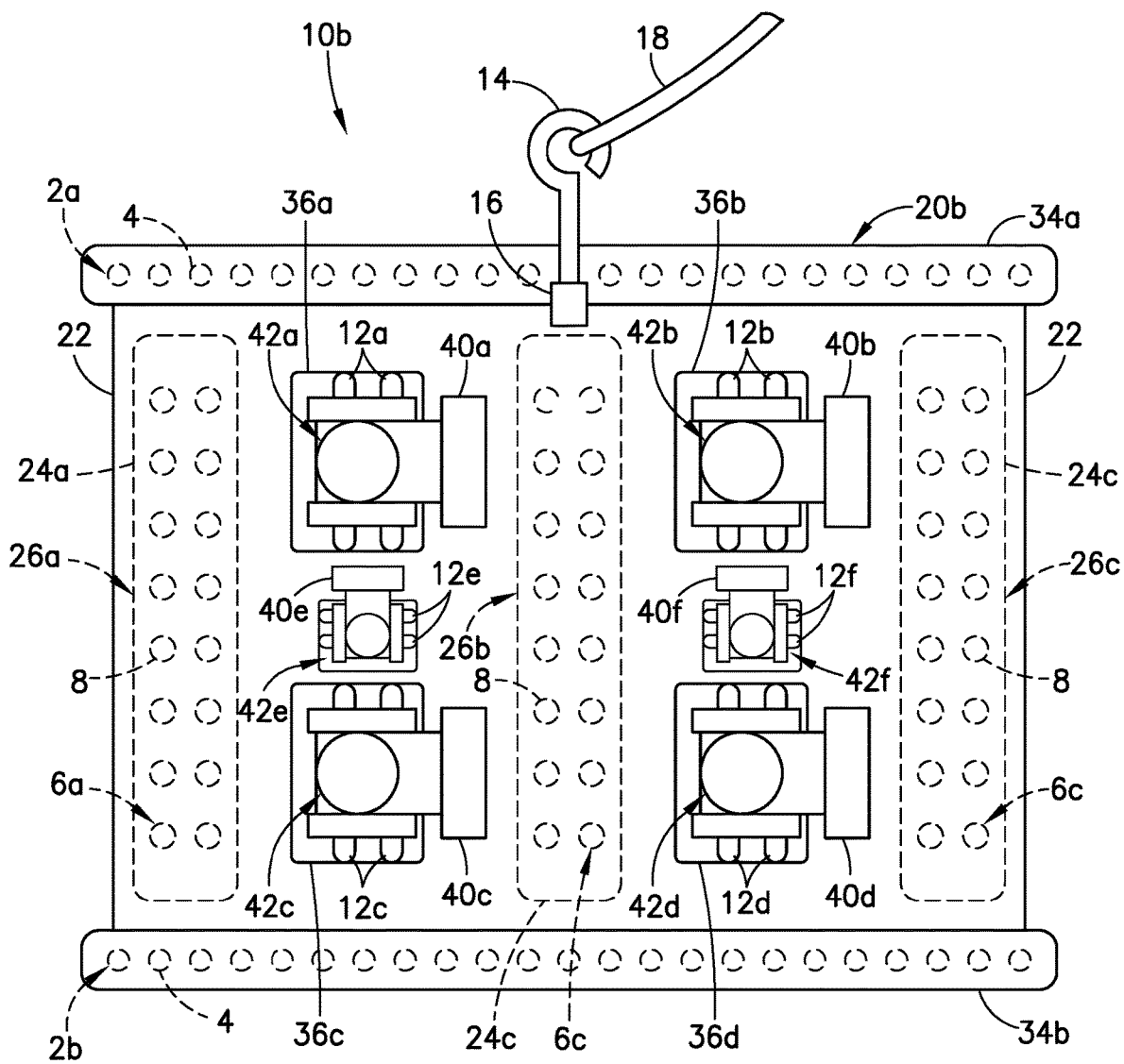
FIG. 4 is a diagram representing a top view of a conformable omni-wheeled crawler vehicle having a flexible base in accordance with a second embodiment. The crawler vehicle is shown with the flexible base in an unflexed (e.g., planar) state. Elements which project from the other side of the flexible base (and thus are not visible in the viewpoint of FIG. 4) are indicated by dashed lines.

Each of the omni wheels 12a-12f seen in FIG. 1 is rotatably coupled to the flexible base 20a by means of respective wheel suspension assemblies (not visible in FIG. 1, but see wheel suspension assemblies 42a-42f in FIG. 4). While wheel suspension assemblies 42a and 42b are shown in more detail in FIGS. 2 and 3, it should be realized that wheel assemblies 42c, 42d, 42e, and 42f are substantially the same as 42a and 42b.

Referring to FIG. 2, wheel suspension assembly 42a supports omni wheel 12a, while wheel suspension assembly 42b supports omni wheel 12b. Each of the wheel suspension assemblies 42a and 42b includes a respective suspension arm 44 to which the associated omni wheel 12a or 12b is rotatably coupled and to which the associated drive motor 40a or 40b is affixed. Each of the wheel suspension assemblies 42a and 42b further includes a respective slider bushing 46 connected to or integrally formed with the respective suspension arm 44. The other wheel suspension assemblies 42c-42f (not shown in FIG. 2, but see FIG. 4) may be identical in construction.

Each slider bushing 46 is slidable on a respective slider post 48. The slider bushing 46 is constrained from rotating about the slider post 48. This constraint may be achieved by using a slider post 48 that has a non-circular cross section and a slider bushing 46 having a following orifice with a matching non-circular cross section. Each slider post 48 is attached to the flexible substrate 22 by means of a respective attachment cage 52. A respective compression spring 50 exerts a spring force that urges the respective slider bushing 46 to slide along the respective slider post 48 toward the confronting surface of the airfoil-shaped body 100 being inspected. This spring force is transmitted through the suspension arm 44 to the associated omni wheel 12a or 12b, which in turn exerts an equal force on the confronting surface in the areas of wheel contact. More specifically, each of the wheel suspension assemblies 42a-42f is preferably designed to maintain a consistent normal (perpendicular) contact force (being exerted by the suspended wheel) regardless of surface contour. The amount of friction between the wheels and the confronting surface, which depends on the normal force being exerted in the areas of wheel contact, should be sufficient to prevent the wheels from slipping during movement of the crawler vehicle 10a. The normal force must be less than the vacuum adherence force generated in the region around each wheel.

FIG. 4 is a diagram representing a top view of a conformable omni-wheeled crawler vehicle 10b having a flexible base 20b in accordance with a second embodiment. The crawler vehicle 10b is shown with the flexible base 20b in an unflexed (e.g., planar) state. Elements which project from the other side of the flexible base (and thus are not visible in the viewpoint of FIG. 4) are indicated by dashed lines.

One difference between the respective embodiments depicted in FIGS. 1 and 4 is that the omni wheels 12e and 12f of crawler vehicle 10b (see FIG. 4) are smaller than the omni wheels 12e and 12f of crawler vehicle 10a (see FIG. 1). The embodiment shown in FIG. 4 is especially useful when the scanning procedure calls for the majority of movements to be in a direction perpendicular rather than parallel to the respective planes in which the sensor arrays 2a and 2b are disposed. For example, when the crawler vehicle is traveling along the leading edge 102, the only lateral movements which may be needed might be small adjustments to maintain the crawler vehicle in alignment with the leading edge 102.

Figure 5:
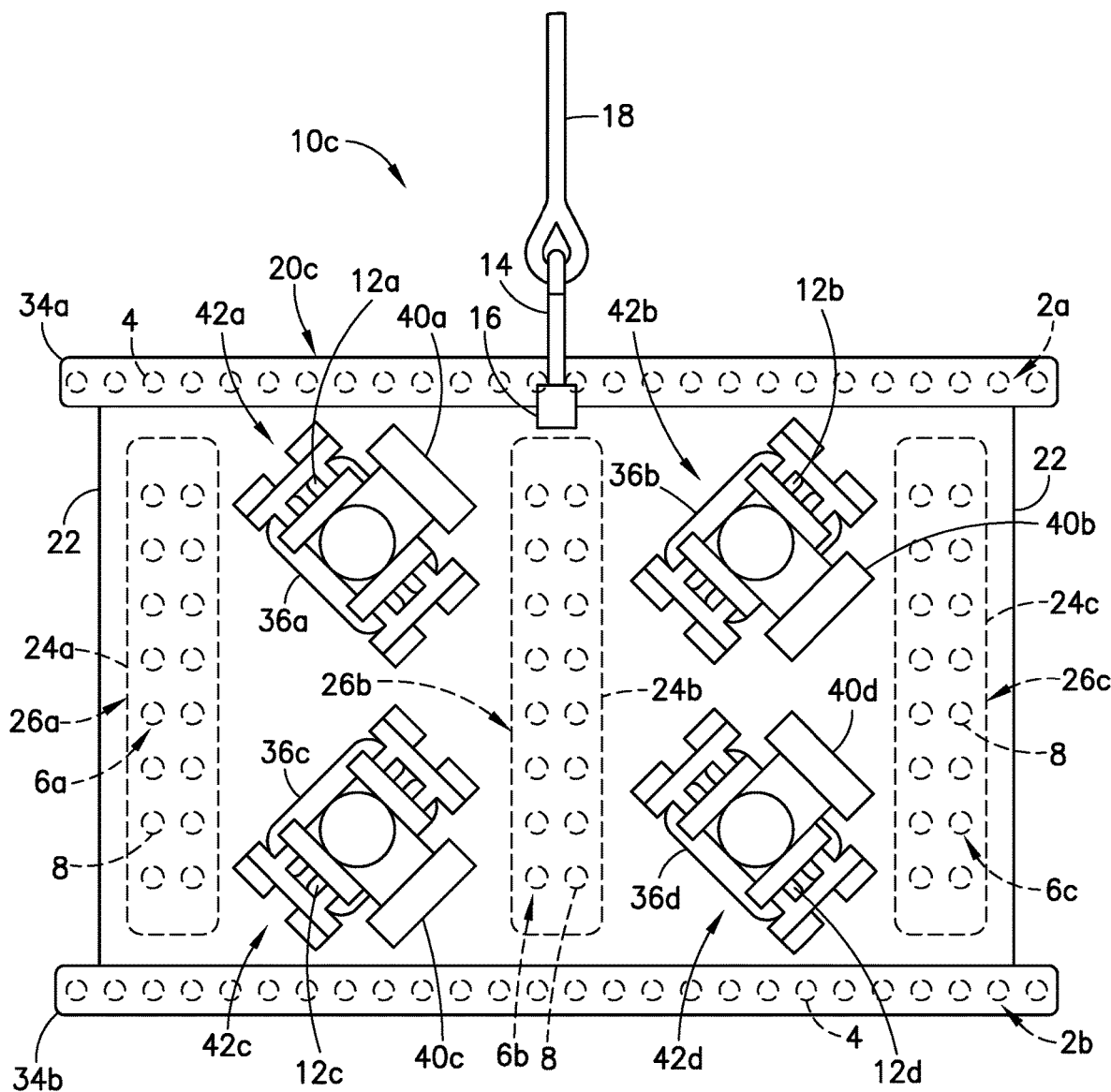
FIG. 5 is a diagram representing a top view of a conformable omni-wheeled crawler vehicle having a flexible base in accordance with a third embodiment. The crawler vehicle is shown with the flexible base in an unflexed (e.g., planar) state. Elements which project from the other side of the flexible base (and thus are not visible in the viewpoint of FIG. 5) are indicated by dashed lines.

FIG. 5 is a diagram representing a top view of a conformable omni-wheeled crawler vehicle 10c having a flexible base 20c in accordance with a third embodiment. The crawler vehicle 10c is shown with the flexible base 20c in an unflexed (e.g., planar) state. Elements which project from the other side of the flexible base 20c (and thus are not visible in the viewpoint of FIG. 5) are indicated by dashed lines. The crawler vehicle 10c depicted in FIG. 4 has four omni wheels 12a-12d supported by respective wheel suspension assemblies 42a-42d and operatively coupled to respective drive motors 40a-40b. The omni wheels 12a and 12d have axes of rotation which are mutually parallel; likewise the omni wheels 12b and 12c have axes of rotation which are mutually parallel, but which are perpendicular to the axes of rotation of omni wheels 12a and 12d.

The omni wheels 12a-12b provide traction during rotation as any other wheel would. However, each of the omni wheels has a multiplicity of small rollers rotatably coupled along the outer peripheries of the wheels. The omni wheels 12a-12d are designed to provide a minimum amount of friction sideways, allowing the crawler vehicle 10c to move in any direction. The axes of rotation of the small rollers on the peripheries of the omni wheels 12a-12d are perpendicular to the axes of rotation of the shafts 38 of the omni wheels 12a-12d.

In accordance with alternative embodiments, Mecanum wheels may be substituted for omni wheels. Mecanum wheels have small rollers on their peripheries with axes of rotation at a 45-degree angle relative to the axes of rotation of the shafts of the Mecanum wheels. This allows the Mecanum wheels to be mounted like regular wheels but still provides the same type of omnidirectional movement as is provided by omni wheels.

Figure 6:
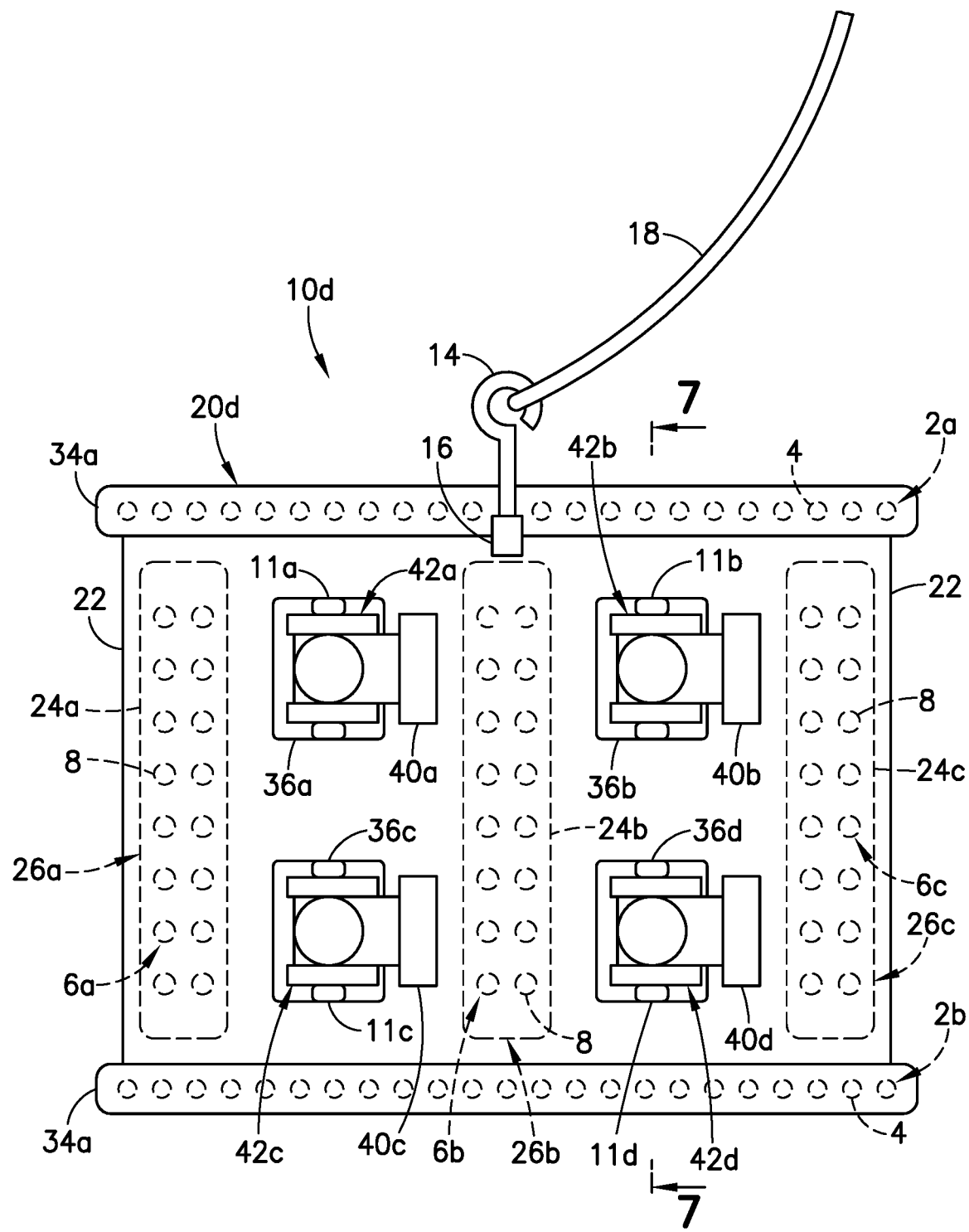
FIG. 6 is a diagram representing a top view of a conformable Mecanum-wheeled crawler vehicle having a flexible base in accordance with a fourth embodiment. The crawler vehicle is shown with the flexible base in an unflexed (e.g., planar) state. Elements which project from the other side of the flexible base (and thus are not visible in the viewpoint of FIG. 6) are indicated by dashed lines.
Figure 7:
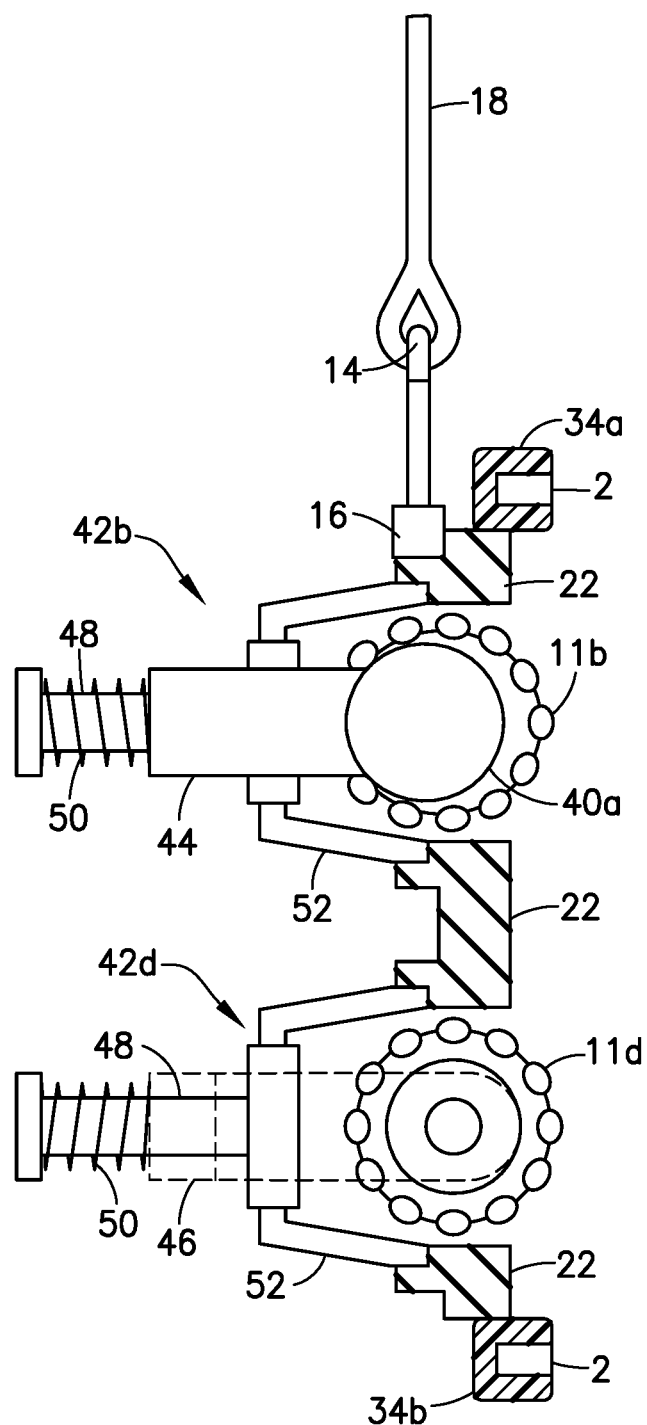
FIG. 7 is a diagram representing a partial sectional view of the conformable Mecanum-wheeled crawler vehicle depicted in FIG. 6. The cross section is taken in a plane indicated by section line 7-7 in FIG. 6.

FIG. 6 is a diagram representing a top view of a conformable Mecanum-wheeled crawler vehicle 10d having a flexible base 20d in accordance with a fourth embodiment. The crawler vehicle 10d is shown with the flexible base 20d in an unflexed (e.g., planar) state. Elements which project from the other side of the flexible base 20d (and thus are not visible in the viewpoint of FIG. 6) are indicated by dashed lines. FIG. 7 is a diagram representing a partial sectional view of the crawler vehicle 10d depicted in FIG. 6. The cross section is taken in a plane indicated by section line 7-7 in FIG. 6.

As seen in FIG. 6, the flexible base 20d includes a flexible substrate 22 having a multiplicity of openings 36a-36d and a pair of flexible sensor array supports 34a and 34b attached to or integrally formed with opposite sides of the flexible substrate 22. The crawler vehicle 10d further includes a multiplicity of Mecanum wheels 11a-11d which are rotatably coupled to the flexible base 20d and configured to enable holonomic motion of the flexible base 20d. The flexible base 20d has four openings 36a-36d which enable the Mecanum wheels 11a-11d to respectively contact any surface on which the crawler vehicle 10d is placed. Each of the four Mecanum wheels 11a-11d has a respective shaft (not shown in FIG. 6) which is operatively coupled to a respective one of four independently controlled drive motors 40a-40d (one per wheel). In the proposed implementation depicted in FIG. 6, the shafts (and axes of rotation) of the Mecanum wheels 11a-11d are parallel to each other. The multiplicity of drive motors 40a-40d are fixedly coupled to the flexible base 20d and operatively coupled to drive rotation of the multiplicity of Mecanum wheels 11a-11d. Although the drive motors 40a-40d are independently operable by means of respective motor controllers (not shown in FIG. 6, but see motor controllers 32 in FIG. 9), the operation of the drive motors 40a-40d may be coordinated by a master controller or control computer to produce holonomic motion of the crawler vehicle 10d while the crawler vehicle 10d is vacuum adhered to a surface of the airfoil-shaped body 100.

As seen in FIG. 6, the flexible base 20d of crawler vehicle 10d is further configured to incorporate respective vacuum adherence devices that form respective suction zones 26a-26c underneath the flexible base 20d. The structure of the flexible base 20d in accordance with the embodiment depicted in FIGS. 6 and 7 may be the same as the structure of the flexible base 20a depicted in FIG. 1 except for the number and placement of the openings 36a-36d in the flexible substrate 22. More specifically, the flexible base 20d includes three low-surface-friction flexible skirts 24a-24c attached to the flexible substrate 22 to form respective perimeters of respective suction zones 26a-26c. Three pluralities 6a-6c of omnidirectional rolling elements 8 are rollably coupled to the flexible substrate 22. As previously described, the first suction zone 26a is partly occupied by the first plurality 6a of omnidirectional rolling elements 8, the second suction zone 26b is partly occupied by the second plurality 6b of omnidirectional rolling elements 8, and the third suction zone 26c is partly occupied by the third plurality 6c of omnidirectional rolling elements 8.

Each of the Mecanum wheels 11a-11d seen in FIG. 6 is rotatably coupled to the flexible base 20d by means of respective wheel suspension assemblies 42a-42d. Wheel suspension assemblies 42b and 42d are shown in more detail in FIG. 7. The wheel suspension assemblies 42a-42d that support the Mecanum wheels 11a-11d may be similar if not identical in construction to the wheel suspension assemblies 42a and 42b that support the omni wheels 12a and 12b seen in FIG. 2.

The Mecanum-wheeled crawler vehicle 10d is a holonomic system, meaning that it can move in any direction while simultaneously rotating. This is possible because of the shape of the wheels. The standard configuration for a Mecanum-wheeled vehicle has four Mecanum wheels (two type "A" and two type "B"). The Mecanum wheels are arranged with the "A" pair on one diagonal and the "B" pair on the other, with each having its shaft (or axle) perpendicular to a line running through the center of the vehicle. The axes of the rollers on the type "A" Mecanum wheels are at right angles to the axes of the rollers on the type "B" Mecanum wheels. However, the platform may have any multiple of four Mecanum wheel, e.g., 4, 8, 12, etc.

The holonomic-motion crawler vehicle 10d shown in FIG. 6 utilizes four Mecanum wheels 11a-11d. Each Mecanum wheel 11a-11d has a multiplicity of tapered rollers rotatably mounted to its circumference, each tapered roller being freely rotatable about its own axis. These tapered rollers have an axis of rotation which lies at a 45° angle with respect to the plane of the wheel. Type "A" Mecanum wheels have left-handed rollers, while Type "B" Mecanum wheels have right-handed rollers. The holonomic-motion crawler vehicle 10d can be made to move in any direction and turn by varying the speed and direction of rotation of each Mecanum wheel 11a-11d. For example, rotating all four Mecanum wheels 11a-11d in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 8:
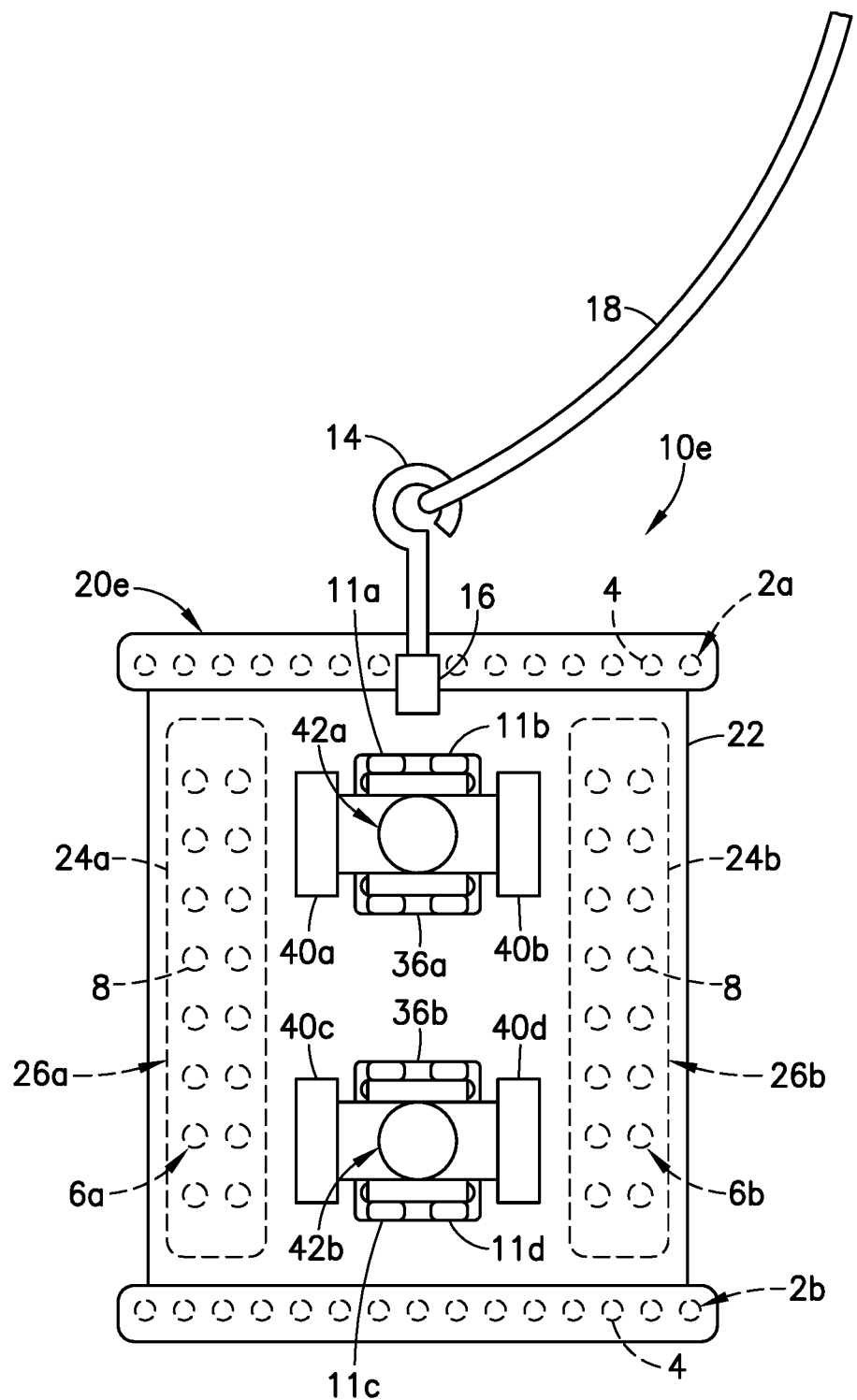
FIG. 8 is a diagram representing a top view of a conformable Mecanum-wheeled crawler vehicle having a flexible base in accordance with a fifth embodiment. The crawler vehicle is shown with the flexible base in an unflexed (e.g., planar) state. Elements which project from the other side of the flexible base (and thus are not visible in the viewpoint of FIG. 8) are indicated by dashed lines.

FIG. 8 is a diagram representing a top view of a conformable Mecanum-wheeled crawler vehicle 10e having a flexible base 20e in accordance with a fifth embodiment. The crawler vehicle 10e is shown with the flexible base 20e in an unflexed (e.g., planar) state. Elements which project from the other side of the flexible base (and thus are not visible in the viewpoint of FIG. 8) are indicated by dashed lines. The embodiment depicted in FIG. 8 differs from the embodiment depicted in FIG. 6 in that a first pair of Mecanum wheels 11a and 11b are rotatably coupled to a first wheel suspension assembly 42a having respective drive motors 40a and 40b affixed thereto, while a second pair of Mecanum wheels 11c and 11d are rotatably coupled to a second wheel suspension assembly 42b having respective drive motors 40c and 40d affixed thereto.

All of the embodiments depicted in FIGS. 1-8 employ omnidirectional wheels. Despite the various differences in the respective configurations of the flexible bases 20a-20e, one common aspect is that two or more omni directional wheels (e.g., omni wheels 12a and 12c in FIGS. 1, 4 and 5 or Mecanum wheels 11a and 11c in FIGS. 6 and 8) are flanked on opposing sides thereof by respective suction zones 26a and 26b. In other words, two or more omnidirectional wheels are disposed between first and second suction zones 26a and 26b, which act to hold the crawler vehicle in a stable position relative to an airfoil-shaped body with the omnidirectional wheels generally perpendicular to the surface which the omnidirectional wheels are in contact with. The first and second suction zones 26a and 26b, along with the omnidirectional wheels therebetween, are in turn disposed between first and second sensor arrays 2a and 2b. In addition, the embodiments shown in FIGS. 1, 4, 5 and 6 further include a third suction zone 26c, with another two or more omnidirectional wheels disposed between the second and third suction zones 26b and 26c—the third suction zone 26c, along with the additional omnidirectional wheels therebetween, also being disposed between the first and second sensor arrays 2a and 2b. Although the provision of two sensor arrays is advantageous, optionally the crawler vehicle may carry only a single sensor array.

Figure 13B:
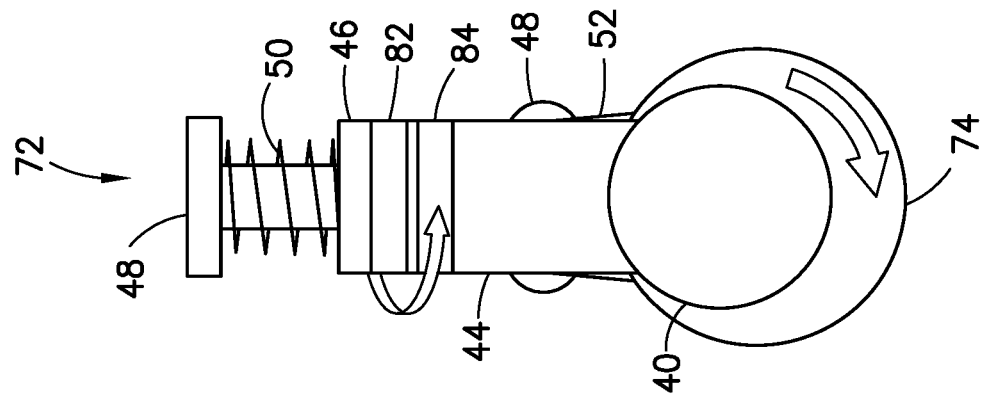
FIGS. 13A and 13B are diagrams representing front and sides views respectively of a wheel suspension assembly that includes a steerable wheel made of solid elastomeric material.
Figure 13A:
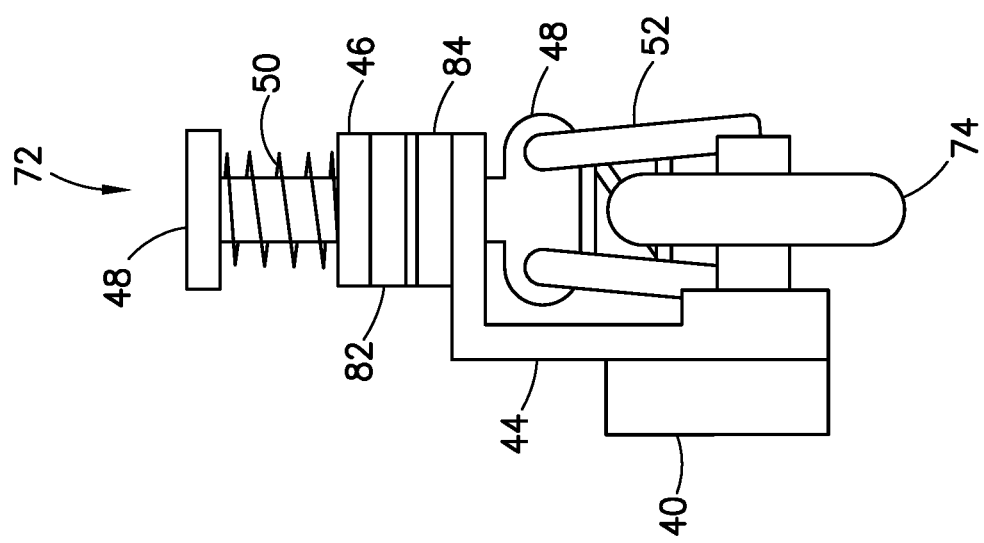

In accordance with alternative embodiments, instead of omni wheels and Mecanum wheels, the conformable crawler vehicle may be equipped with four steerable wheels, each steerable being made of a solid elastomeric material, such as rubber or silicone rubber, and having a high-grip tread. FIGS. 13A and 13B are diagrams representing front and sides views respectively of a wheel suspension assembly 72 that includes a steerable wheel 74 made of solid elastomeric material. The wheel suspension assembly 72 further includes a suspension arm 44 to which the steerable wheel 74 is rotatably coupled and to which the associated drive motor 40 is affixed. The wheel suspension assembly 72 also includes a slider post 48, which is attached to the flexible substrate (not shown in FIGS. 13A and 13B) by means of an attachment cage 52, and a slider bushing 46 that is slidable, but not rotatable relative to the slider post 48. A compression spring 50 exerts a spring force that urges the slider bushing 46 to slide along the respective slider post 48 toward the confronting surface of the airfoil-shaped body 100 being inspected.

In accordance with the embodiment depicted in FIGS. 13A and 13B, the suspension arm 44 is rotatable about the slider post by means of a turret assembly comprising a turret base 82, which is affixed to the slider bushing 46, and a turret head 84, which is rotatably coupled to the turret base 82. The slider post 48 passes through respective openings in the turret base 82 and turret head 84. The turret head 84 is driven to rotate by a stepper motor (not shown in FIGS. 13A and 13B). The crawler vehicle may be directionally controlled by pivoting the turret heads to vector the four steerable wheels 74 in appropriate directions, and then driving the steerable wheels 74 in the manner in which an automobile with four-wheel steering is driven.

The slider bushing 46 is constrained from rotating about the slider post 48. This constraint may be achieved by using a slider post 48 that has a non-circular cross section and a slider bushing 46 having a following orifice with a matching non-circular cross section. In contrast, the suspension arm 44 would have a broader orifice so that when affixed to the turret head 84, rotation of the suspension arm 44 about the slider post 48 would not be constrained. In this way, the suspension arm 44 may be made to rotate about the slider post 48 during steering of the steerable wheel 74.

In accordance with a further alternative embodiment, the wheels are rotatably mounted to the flexible substrate 22 without a spring suspension. Instead, the elastomeric properties of the flexible substrate 22 provide a sufficiently wide range of normal force. In a suspensionless embodiment, the motor for driving rotation of the wheel would be directly mounted to the flexible substrate 22.

Figure 9:
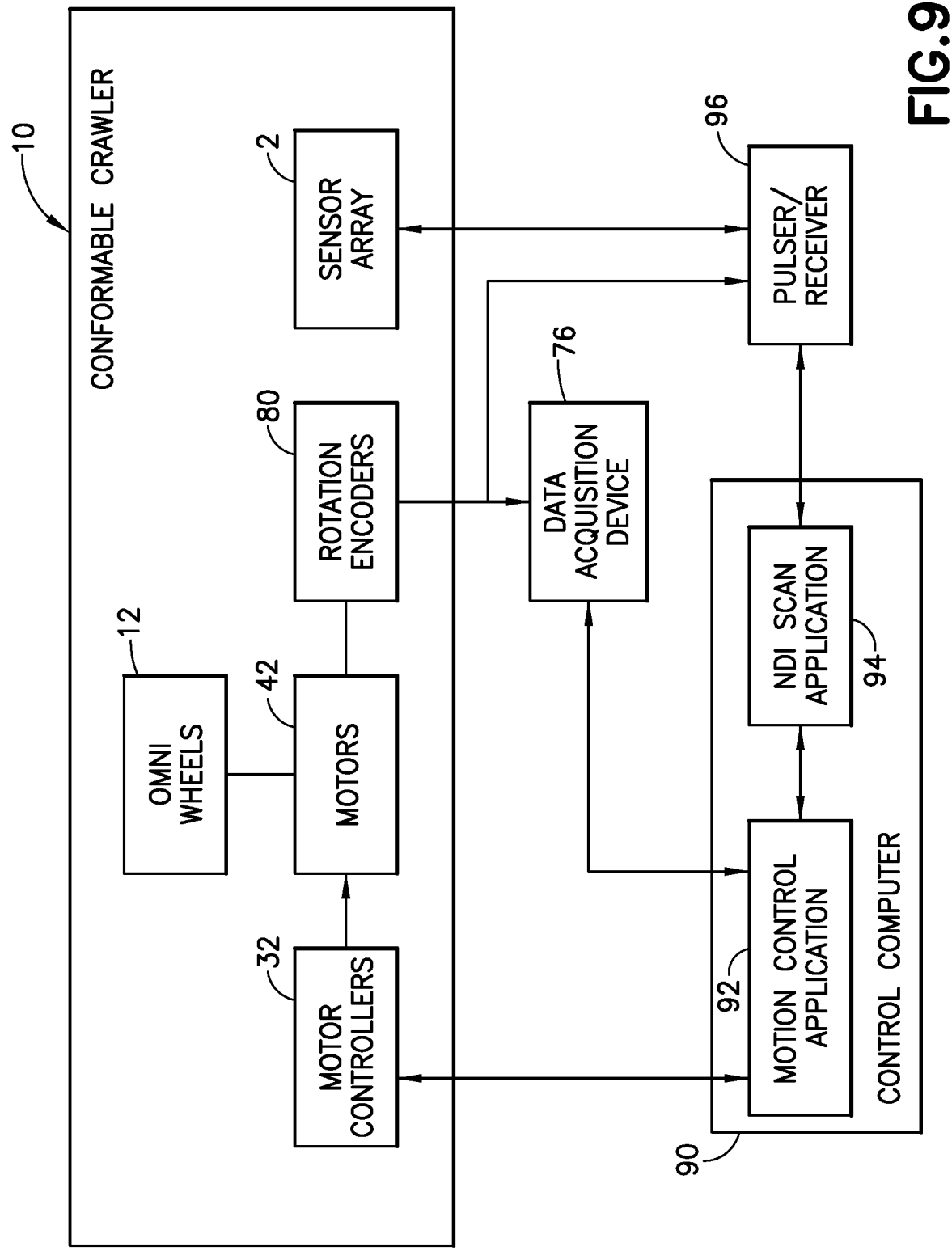
FIG. 9 is a block diagram identifying some components of a system for automated non-destructive inspection of an airfoil-shaped body that may include any one of the conformable crawler vehicles depicted in FIGS. 1-8.

FIG. 9 is a block diagram identifying some components of a system for automated non-destructive inspection of an airfoil-shaped body that may include an omni-wheeled crawler vehicle 10 of any one of the types depicted in FIGS. 1-8. The crawler vehicle 10 includes a multiplicity of omni wheels 12 operatively coupled to respective drive motors 40. The crawler vehicle 10 further includes motor controllers 32 for independently controlling the drive motors 40 in accordance with commands received from a control computer 90. The control computer 90, which may be located on the ground, may communicate with the motor controllers 32 via an electrical cable (not shown in FIG. 9). The system depicted in FIG. 9 further includes rotation encoders 80 which are operatively coupled to the motors 40. The system further includes a data acquisition device 76 configured to read the rotation encoders 80. The control computer 90 uses the rotation encoder data received from the data acquisition device 76 to track the relative location (e.g., relative to an initial absolute location acquired using a local positioning system) of the crawler vehicle 10.

More specifically, the control system includes a ground-based control computer 90 programmed with motion control application software 92 and NDI scan application software 94. The control computer 90 may comprise a general-purpose computer programmed with motion control application software 92 comprising respective software modules for controlling the drive motors 40. The control computer 90 outputs commands to the motor controllers 32 for controlling the operation of the drive motors 40.

The control computer 90 also hosts NDI scan application software 94 that controls a pulser/receiver 96. In accordance with the architecture depicted in FIG. 9, the pulser/receiver 96 is coupled to a sensor array 2 carried by the crawler vehicle 10. The pulser/receiver 96 sends pulses to and receives return signals from the respective sensor arrays 2 onboard the crawler vehicle 10. The NDI scan application software 94 running on control computer 90 controls all details of the scan data and the display of data. The pulser/receiver 96 correlates the acquired NDI sensor data with crawler vehicle position information received from the rotation encoders 80. The data acquisition device 76 in turn sends the crawler vehicle position data to the motion control software application 90 that runs on the control computer 90. The pulser/receiver 96 sends the crawler vehicle position data to the NDI scan application software 94 that runs on the control computer 90.

In accordance with one embodiment, the motion control application software 92 may be configured to estimate the position of the crawler vehicle 10 in absolute coordinates following the completion of a motion that was tracked incrementally, e.g., using rotation encoders 80 operatively coupled to the drive motors 40 (or to the omni wheels 12). One example of an incremental motion measurement system is a dead-reckoning odometry-based system. Any dead-reckoning solution will have measurement inaccuracies due to small errors that build up over time. These can be caused by systematic errors in the device or disruptions caused by unexpected changes in the environment. The motion control application software 92 may be configured to estimate the positions of the omni wheels 12 based on the outputs of the rotation encoders 80 using an odometry-based method. Each rotation encoder 80 will output an encoder count proportional to the angle of rotation of a respective omni wheel.

The control computer 90 stops the crawler vehicle 10 when the counts of encoder pulses indicate that the crawler vehicle 10 has arrived at the desired location. The current location of the stopped device can then be checked to determine to what extent it may deviate from the desired location. In accordance with the teachings herein, corrections can be made to the relative motion measurements by acquiring accurate, absolute measurements at lower update rates. This absolute measurement process (performed while the target object is stopped) can be integrated into a relative motion measurement system running at higher update rates, which acquires relative motion measurements while the target object is moving. In accordance with one embodiment disclosed hereinafter, a lower-update-rate local positioning system-based process provides corrections to a higher-update-rate odometry system.

In accordance with some embodiments, an airfoil-shaped body 100 (e.g., a wind turbine blade) may undergo non-destructive inspection while the airfoil-shaped body 100 is disposed in an angular position that is generally vertical instead of generally horizontal. FIG. 10 is a diagram representing a front view of a portion of a generally vertically oriented airfoil-shaped body 100 having an apparatus that is configured to non-destructively inspect both side surfaces 104 and 106 and the connecting surface area intersected by the leading edge 102.

The apparatus depicted in FIGS. 10 and 11 includes a wheeled vehicle in the form of a carriage 54 that is movably coupled to a generally horizontal flexible track 62. The flexible track 62 is wrapped around and conforms to the shape of the profile of and is attached to the surface of the generally vertically oriented airfoil-shaped body 100. In accordance with the proposed implementation depicted in FIGS. 10 and 11, the flexible track 62 is adhered to the surfaces of the airfoil-shaped body 100 by a multiplicity of suction cups 64, which suction cups 64 are in turn are attached to the flexible track 62 at spaced positions along the length of the flexible track 62. As depicted in FIG. 10, excess track is allowed to extend past the trailing edge 108 of the airfoil-shaped body 100.

As seen in FIGS. 10 and 11, the carriage 54 includes a carriage frame 56 and a drive motor 66 mounted to the carriage frame 56. The carriage 54 includes a carriage frame 56 having two pairs of wheels rotatably coupled to the carriage frame 56—one pair of wheels which roll on one side of the flexible track 62 and another pair of wheels which roll on the other side of the flexible track 62. In the embodiment depicted in FIGS. 10 and 11, the four wheels include three follower wheels 60 (visible in FIG. 10) and one drive wheel 58 (visible in FIG. 11). The carriage 54 is further equipped with a drive motor 66 for driving rotation of the drive wheel 58. The drive motor 66 may be controlled to drive the drive wheel 58 to rotate in either direction (into or out of the plane of the paper on which FIG. 11 is printed). Rotation of the drive wheel 58 in one rotational direction causes the carriage 54 to move along the flexible track 62 in one direction; rotation of the drive wheel 58 in an opposite rotational direction causes the carriage 54 to move along the flexible track 62 in the opposite direction.

As best seen in FIG. 10, the carriage 54 is further equipped with a cable spool 68 and a spool motor 70 which is operatively coupled to drive rotation of the cable spool 68. The cable spool 68 on carriage 54 has a portion of a cable 18 wound thereon. For the purpose of illustration, the distal end of the cable 18 is shown connected to a crawler vehicle 10e of the type depicted in FIG. 8. Any other type of crawler vehicle disclosed above may be similarly attached to the distal end of a cable 18. The cable 18 acts as a tether that prevents the crawler vehicle 10e from falling to the ground in the event that the suction devices onboard the crawler vehicle 10e cease to operate or produce insufficient suction force.

Although not shown in the drawings, the cable 18 may incorporate or have attached thereto a power/signal cable by means of which the electrical components (e.g., motors) onboard the crawler vehicle 10 receive electric power and control signals. In addition, the sensors onboard the crawler vehicle 10e may communicate with a pulser/receiver via the power/signal cable. Similarly, one or more air hoses may be attached to the cable 18 for providing vacuum pressure to the vacuum adherence devices onboard the crawler vehicle 10e. In the case where the sensors onboard the crawler vehicle 10e are high-frequency acoustic sensors, acoustic couplant (e.g., water) may be provided via another hose attached to the cable 18. For example, a pump or a gravity-feed reservoir may be mounted on the carriage 54 seen in FIG. 10. Low-frequency acoustic sensors (such as bond testers) do not require acoustic couplant.

Since the crawler vehicle 10e is self-powered, a retracting spooled cable coming from the carriage 54 is not required to maintain the crawler vehicle's vertical position, but would be helpful to keep the cable 18 from interfering with the crawler vehicle activity. So the cable spool 68 is an option that could be tensioned to simply wind the cable 18 as the crawler vehicle 10e ascends and unwind the cable 18 as the crawler vehicle 10e descends and puts additional weight on the cable 18. Optionally the cable spool could be mounted on the crawler vehicle 10e instead of the carriage 54.

The flexible track 62 is wrapped around the airfoil-shaped body 100 in a chordwise direction and conforms to the profile of the airfoil-shaped body 100. Thus the flexible track 62 will have a curved section that wraps around the leading edge 102 of the airfoil-shaped body 100, allowing the carriage 54 to travel around the leading edge 102 from a position adjacent the side surface 104 (shown in FIG. 10) to a position adjacent the side surface 106 (not shown in FIG. 10). The carriage 54 does not have to be precisely vertically positioned above the crawler vehicle 10e and instead may simply follow the crawler vehicle 10e. However, a simple follower approach minimizes the length required for the cabling and would keep the crawler vehicle 10e from falling too far if the crawler vehicle 10e were to detach from the airfoil-shaped body 100. Following could be done via an angle-activated control switch where the cable 18 leaves the carriage 54 through a hole at the end of a small rotatable arm that will follow the cable angle. The carriage 54 has an onboard controller that controls the drive motor 66 in dependence on the output of a sensor that detects the angular position of the rotatable arm.

In the embodiments disclosed above, the vacuum adherence devices included flexible skirts 24a-24c that define suction zones. In accordance with alternative embodiments, vacuum adherence devices 150 of the type depicted in FIGS. 12A and 12B may be employed instead of flexible skirts 24a-24c. For example, instead of three suctions zones 26a-26c (see, e.g., FIG. 1), three sets or pluralities of vacuum adherence devices 150 could be incorporated in respective suction zones under the flexible base 22, each set of vacuum adherence devices 150 in turn being supported by respective sets or pluralities of omnidirectional rolling elements 8.

Figure 12A:
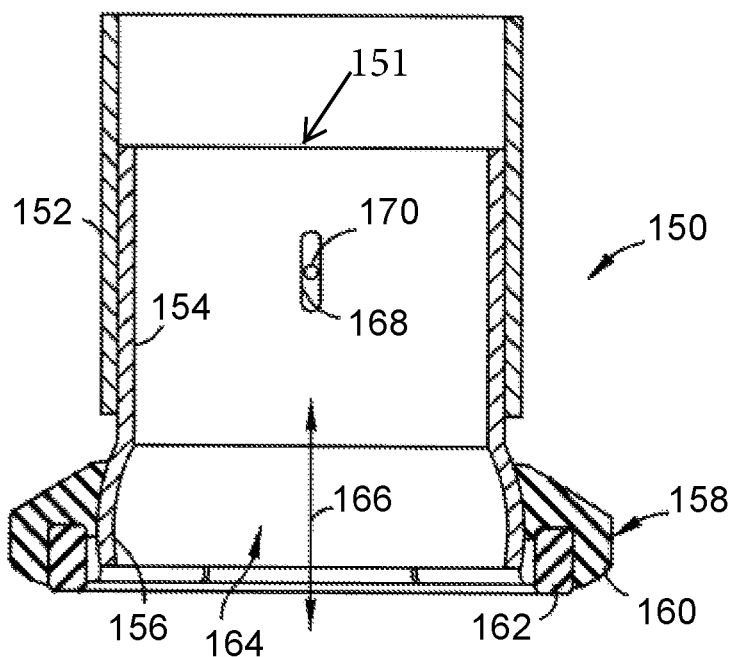
FIG. 12A is a diagram representing a cross-sectional view of a vacuum adherence device in accordance with one proposed implementation.

FIG. 12A is a diagram showing a cross-sectional view of a vacuum adherence device 150 in accordance with one implementation. This vacuum adherence device 150 comprises a circular cylindrical sleeve housing 152 and a sleeve 151 having a circular cylindrical portion 154 which is axially slidable along a center axis 166 inside the sleeve housing 152. The sleeve 151 further comprises bearing portion 156 having an outer spherical bearing surface having a center point located along the center axis 166. The bearing portion 156 may be integrally formed with the aforementioned circular cylindrical portion 154 of sleeve 151. The vacuum adherence device 150 further comprises a pivotable seal assembly 158 comprising a socket ring 160 that holds a seal 162. The socket ring 160 also has an inner spherical bearing surface which is concentric with and pivotably coupled to the outer spherical bearing surface of bearing portion 156 of sleeve 151. The pivot point of the socket ring 160 is collocated with the center point of the outer spherical bearing surface of bearing portion 156 of sleeve 151.

The pivotable seal assembly 158 is configured to rotate relative to the sleeve 151 about the pivot point to at least partially conform to a shape of a confronting surface. The vacuum adherence device 150 can adhere to such a confronting surface when air is drawn into a channel 164 formed in part by the channel of sleeve housing 152, in part by the channel of sleeve 151, and in part by the opening in the seal 162. The pivotable seal assembly 158 is configured to rotate relative to the sleeve 151 independently of translational movement of the sleeve 151 in a direction parallel to the center axis 166 within the sleeve housing 152. The amount of rotation of pivotable seal assembly 158 may be limited by the size and/or shape of the outer spherical bearing surface of the bearing portion 156 of sleeve 151.

Although not shown in FIG. 12A, the vacuum adherence device 150 preferably comprises a spring arranged to urge the sleeve 151 to extend out of the sleeve housing 152 by downward (as seen in the view of FIG. 12A) sliding along the center axis 166. This sliding movement may be restricted to within a selected range of movement. However, sleeve 151 may "float" freely relative to sleeve housing 152 within this selected range of movement. This restriction of the translational motion of sleeve 151 can be implemented by providing a slot 168 in the wall of the circular cylindrical portion of sleeve 151 and by providing a pin 170 which extends radially inward from the wall of sleeve housing 152 and into the slot 168. The pin 170 may also be used to hold sleeve 151 inside sleeve housing 152. The length of slot 168 restricts the sliding movement of sleeve 151 relative to sleeve housing 152.

The channel 164 is in fluid communication with a control valve (not shown in FIG. 12A), which control valve is in turn in flow communication with a vacuum pump (also not shown in FIG. 12A, but see vacuum pump 25 in FIG. 2). The vacuum pump 25, control valve, channel 164, and connecting conduits form a vacuum system which is configured to draw air into the channel 164 such that a vacuum adherence is formed between the pivotable seal assembly 158 and a confronting surface. The vacuum adherence is the result of a vacuum pressure generated inside the channel 164 that produces suction forces. The seal 162 may be formed of any one of a number of different flexible materials. For example, seal 162 may comprise silicone rubber or other elastomeric material, a viscoelastomeric material, or some other suitable flexible material.

Figure 12B:
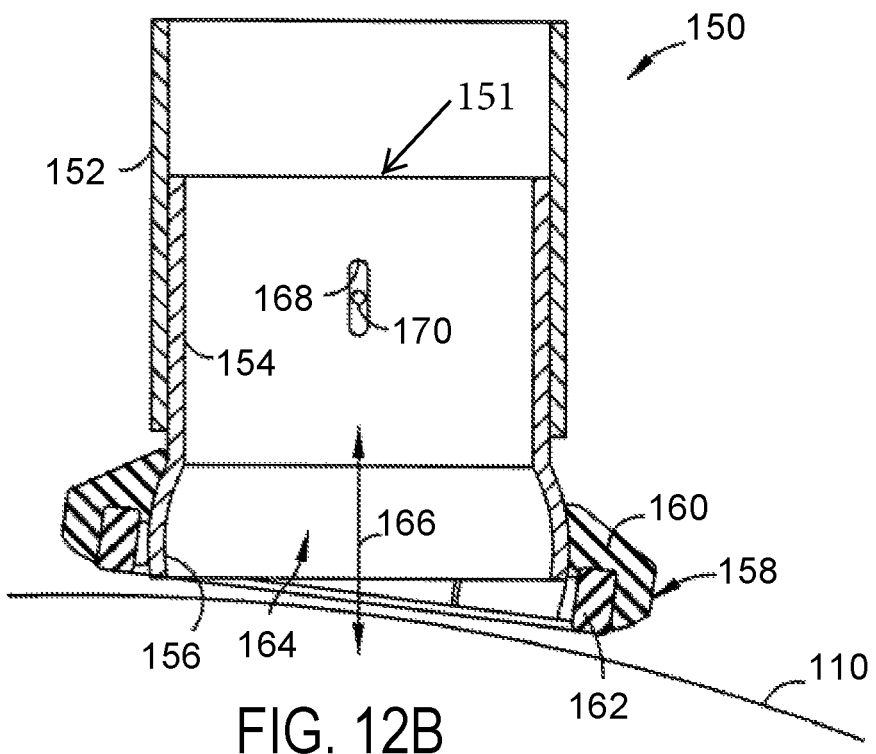
FIG. 12B is a diagram representing a cross-sectional view of the vacuum adherence device depicted in FIG. 12A adhered to a non-planar blade surface. The air gap between the vacuum adherence device and the non-planar surface has been exaggerated for the purpose of illustration.

FIG. 12B shows a cross-sectional view of the vacuum adherence device 150 depicted in FIG. 12A adhered to a convex curved external surface 110. The air gap between the vacuum adherence device 150 and the external surface 110 has been exaggerated for the purpose of illustration. The air gap may function as an air bearing that holds the pivotable seal assembly 158 close to the external surface 110, while reducing static friction to within selected tolerances. In other words, the air gap allows pivotable seal assembly 158 to "float" above the external surface 110 while maintaining vacuum adherence between pivotable seal assembly 158 and external surface 110. Further, the air gap allows pivotable seal assembly 158 to be moved over the external surface 110 with a reduced amount of static friction and without causing undesired effects to the surface.

While apparatuses for automated non-destructive inspection of the leading edge surface and other surfaces of airfoil-shaped bodies have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An apparatus comprising:
a flexible substrate which is conformable to a curved surface on a leading edge of an airfoil-shaped body;
a multiplicity of wheels rotatably coupled to the flexible substrate and configured to enable omnidirectional motion of the flexible substrate;
a multiplicity of omnidirectional rolling elements rotatably coupled to the flexible substrate;
a flexible sensor array attached to or integrally formed with the flexible substrate;

a multiplicity of motors fixedly coupled to the flexible substrate and operatively coupled to drive rotation of the multiplicity of wheels; and a multiplicity of flexible vacuum seals supported by the flexible substrate.

2. The apparatus as recited in claim 1, wherein the multiplicity of flexible vacuum seals comprise first and second flexible skirts that bound first and second suction zones respectively, the apparatus further comprising first and second vacuum ports in fluid communication with the first and second suction zones respectively.

3. The apparatus as recited in claim 2, wherein the first suction zone is partly occupied by a first plurality of omnidirectional rolling elements, while the second suction zone is partly occupied by a second plurality of omnidirectional rolling elements.

4. The apparatus as recited in claim 2, wherein at least some of the multiplicity of wheels are positioned between the first and second suction zones.

5. The apparatus as recited in claim 1, wherein the flexible vacuum seals comprise pivotable seal assemblies.

6. The apparatus as recited in claim 1, wherein the flexible substrate is made of elastomeric material.

7. The apparatus as recited in claim 1, wherein the flexible sensor array comprises a multiplicity of sensors arranged in a pattern.

8. The apparatus as recited in claim 1, wherein the wheels are of a type selected from the following types: omni wheels, Mecanum wheels and steerable wheels made of an elastomeric solid material.

9. An apparatus comprising:
a flexible substrate having a multiplicity of openings;
a multiplicity of wheel suspension assemblies attached to the flexible substrate, each wheel suspension assembly overlying a respective opening in the flexible substrate;
a multiplicity of wheels rotatably coupled to the multiplicity of wheel suspension assemblies, positioned in the multiplicity of openings, and configured for omnidirectional motion;
a multiplicity of motors attached to and supported by the multiplicity of wheel suspension assemblies and operatively coupled to drive rotation of the multiplicity of wheels;
a first flexible sensor array attached to or integrally formed with the flexible substrate;
a first multiplicity of omnidirectional rolling elements which are rotatable relative to the flexible substrate;
a first flexible skirt projecting from the flexible substrate and bounding a first suction zone that is partly occupied by respective portions of the first multiplicity of omnidirectional rolling elements;
a second multiplicity of omnidirectional rolling elements which are rotatable relative to the flexible substrate; and
a second flexible skirt projecting from the flexible substrate and bounding a second suction zone that is partly occupied by respective portions of the second multiplicity of omnidirectional rolling elements.

10. The apparatus as recited in claim 9, wherein:
the multiplicity of openings comprise first and second openings disposed between the first and second flexible skirts;
the multiplicity of wheel suspension assemblies comprise a first wheel suspension assembly that overlies the first opening and a second wheel suspension assembly that overlies the second opening;
the multiplicity of wheels comprise first and second wheels rotatably coupled to the first wheel suspension assembly, and third and fourth wheels rotatably coupled to the second wheel suspension assembly; and
the multiplicity of motors comprise first through fourth motors operatively coupled to drive rotation of the first through fourth wheels respectively.

11. The apparatus as recited in claim 10, wherein the first through fourth wheels are Mecanum wheels.

12. The apparatus as recited in claim 9, further comprising:
a third multiplicity of omnidirectional rolling elements which are rotatable relative to the flexible substrate; and
a third flexible skirt projecting from the flexible substrate and bounding a third suction zone that is partly occupied by respective portions of the third multiplicity of omnidirectional rolling elements, and wherein
the multiplicity of openings comprise first and second openings disposed between the first and second flexible skirts and third and fourth openings disposed between the second and third flexible skirts;
the multiplicity of wheel suspension assemblies comprise first through fourth wheel suspension assemblies that respectively overlie the first through fourth openings;
the multiplicity of wheels comprise first through fourth wheels respectively rotatably coupled to the first through fourth wheel suspension assemblies; and
the multiplicity of motors comprise first through fourth motors operatively coupled to drive rotation of the first through fourth wheels respectively.

13. The apparatus as recited in claim 12, wherein the first through fourth wheels are Mecanum wheels.

14. The apparatus as recited in claim 12, wherein the first through fourth wheels are omni wheels, one pair of the first through fourth wheels having mutually parallel axes of rotation and the other pair of the first through fourth wheels having mutually parallel axes of rotation which are perpendicular to the mutually parallel axes of rotation of the one pair.

15. The apparatus as recited in claim 9, further comprising a second flexible sensor array attached to or integrally formed with the flexible substrate, wherein the multiplicity of openings and the first and second flexible skirts are disposed between the first and second flexible sensor arrays.

16. The apparatus as recited in claim 15, wherein the first flexible sensor array comprises a multiplicity of ultrasonic transducers or a multiplicity of eddy current sensors.

17. The apparatus as recited in claim 15, wherein each wheel suspension assembly of the multiplicity of wheel suspension assemblies comprises:
a slider post fixedly coupled to the flexible substrate;
a slider bushing that is slidably coupled to and not rotatable relative to the slider post, the wheel being rotatable relative to but not translatable relative to the slider bushing; and
a spring that urges the slider bushing to slide along the slider post.

18. The apparatus as recited in claim 12, wherein the wheels are steerable wheels made of an elastomeric solid material.

19. The apparatus as recited in claim 18, wherein each wheel suspension assembly of the multiplicity of wheel suspension assemblies comprises:
a slider post fixedly coupled to the flexible substrate;
a slider bushing that is slidably coupled to and not rotatable relative to the slider post;

a spring that urges the slider bushing to slide along the slider post;
a turret head which is rotatably coupled to the slider bushing and through which the slider post passes; and
a suspension arm fixedly coupled to the turret head, the wheel being rotatable relative to but not translatable relative to the suspension arm.

20. An apparatus comprising:
a flexible substrate which is conformable to a curved surface;
a multiplicity of wheels rotatably coupled to the flexible substrate and configured for omnidirectional motion;
a multiplicity of omnidirectional rolling elements rotatably coupled to the flexible substrate;
a flexible sensor array attached to or integrally formed with the flexible substrate;
a multiplicity of motors fixedly coupled to the flexible substrate and operatively coupled to drive rotation of the multiplicity of wheels; and
a flexible skirt projecting from the flexible substrate and bounding a suction zone that is partly occupied by respective portions of the multiplicity of omnidirectional rolling elements.

21. The apparatus as recited in claim 20, wherein the flexible substrate is conformable to a curved surface of an airfoil-shaped body intersected by a leading edge.

22. The apparatus as recited in claim 20, wherein the omnidirectional rolling elements are ball rollers.

23. The apparatus as recited in claim 20, wherein the flexible sensor array comprises a multiplicity of ultrasonic transducers.

24. The apparatus as recited in claim 20, wherein the flexible sensor array comprises a multiplicity of eddy current sensors.

* * * * *